United States Patent
Liu et al.

(10) Patent No.: US 11,943,086 B2
(45) Date of Patent: *Mar. 26, 2024

(54) SYMBOL PROCESSING METHOD AND APPARATUS

(71) Applicant: HUAWEI TECHNOLOGIES CO., LTD., Guangdong (CN)

(72) Inventors: Fengwei Liu, Chengdu (CN); Huang Huang, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/564,450

(22) Filed: Dec. 29, 2021

(65) Prior Publication Data
US 2022/0123979 A1    Apr. 21, 2022

Related U.S. Application Data

(63) Continuation of application No. PCT/CN2020/095627, filed on Jun. 11, 2020.

(30) Foreign Application Priority Data

Jul. 2, 2019 (CN) .......................... 201910591582.8

(51) Int. Cl.
*H04L 27/26* (2006.01)
*H04L 5/00* (2006.01)

(52) U.S. Cl.
CPC ........ *H04L 27/2607* (2013.01); *H04L 5/0048* (2013.01); *H04L 27/2613* (2013.01)

(58) Field of Classification Search
CPC ............. H04L 27/2607; H04L 27/2613; H04L 27/2605; H04L 5/0007; H04L 5/0048
(Continued)

(56) References Cited

U.S. PATENT DOCUMENTS 8,743,855 B2* 6/2014 Han .................... H04L 27/2602
370/328
2005/0163238 A1* 7/2005 Fujii .................... H04L 5/0007
375/E1.005
(Continued)

FOREIGN PATENT DOCUMENTS

CN         1476695 A      2/2004
CN       101138212 A      3/2008
(Continued)

OTHER PUBLICATIONS

3GPP TSG-RAN1 Meeting #92,R1-1803552,CR to 38.211 capturing the Jan. 18 ad-hoc and RAN1#92 meeting agreements,Ericsson,Athens, Feb. 26-Mar. 1, 2018,total 83 pages.
(Continued)

*Primary Examiner* — Emmanuel Bayard
(74) *Attorney, Agent, or Firm* — James Harrison

(57) ABSTRACT

This application provides a symbol processing method and apparatus. The method includes: obtaining a plurality of complex-valued symbols; dividing the plurality of complex-valued symbols into a plurality of sets, where each set corresponds to one transmitted symbol; and performing a copy operation on the plurality of sets, so that two sets corresponding to two transmitted symbols that are consecutive in time domain have some same complex-valued symbols. By enabling two sets corresponding to two transmitted symbols that are consecutive in time domain to have some same complex-valued symbols, a guard interval between symbols can be flexibly configured when a cyclic prefix length is fixed.

22 Claims, 15 Drawing Sheets

---

Obtain a plurality of complex-valued symbols — S810

Divide the plurality of complex-valued symbols into a plurality of sets, where each set corresponds to one transmitted symbol — S820

Perform a copy operation on the plurality of sets, so that two sets corresponding to two transmitted symbols that are consecutive in time domain have some same complex-valued symbols — S830

(58) Field of Classification Search
USPC .......................................... 375/260, 295, 355
See application file for complete search history.

(56) References Cited

U.S. PATENT DOCUMENTS

| | | | |
|---|---|---|---|
| 2007/0165728 A1 | 7/2007 | Parizhsky et al. | |
| 2009/0221282 A1* | 9/2009 | Lee ..................... | H04W 24/10 |
| | | | 455/424 |
| 2010/0111017 A1* | 5/2010 | Um ..................... | H04L 27/2601 |
| | | | 370/329 |
| 2011/0305286 A1 | 12/2011 | Shimezawa et al. | |
| 2015/0078477 A1* | 3/2015 | Hong ................... | H04L 5/0025 |
| | | | 375/295 |
| 2017/0339697 A1* | 11/2017 | Park ..................... | H04L 27/2602 |
| 2018/0367362 A1 | 12/2018 | Sun et al. | |
| 2021/0359889 A1* | 11/2021 | Bouttier ............... | H04L 27/2621 |
| 2022/0123899 A1* | 4/2022 | Liu ..................... | H04L 27/2628 |
| 2022/0263697 A1* | 8/2022 | Ma ..................... | H04L 27/2636 |

FOREIGN PATENT DOCUMENTS

| | | | | |
|---|---|---|---|---|
| CN | 101375571 A | | 2/2009 | |
| CN | 105009539 A | | 10/2015 | |
| EP | 3247079 A1 | * | 11/2017 | ........... H04L 27/262 |
| WO | 2008056901 A1 | | 5/2008 | |
| WO | 2017031649 A1 | | 3/2017 | |
| WO | 2018059330 A1 | | 4/2018 | |

OTHER PUBLICATIONS

3GPP TSG-RAN WG1 #89,R1-1707804, Transmit diversity for DFTsOFDM-based PUCCH in long duration,Mitsubishi Electric,Hangzhou, China, May 15-19, 2017,total 11 pages.

* cited by examiner

US 11,943,086 B2

SYMBOL PROCESSING METHOD AND APPARATUS

CROSS-REFERENCE TO RELATED APPLICATIONS

This application is a continuation of International Application No. PCT/CN2020/095627, filed on Jun. 11, 2020, which claims priority to Chinese Patent Application No. 201910591582.8, filed on Jul. 2, 2019. The disclosures of the aforementioned applications are hereby incorporated by reference in their entireties.

TECHNICAL FIELD

This application relates to the communication field, and specifically, to a symbol processing method and apparatus.

BACKGROUND

To resist a multipath effect of a channel, a technology of adding a guard interval between symbols is proposed. First, the guard interval can remove intersymbol interference (ISI) between adjacent symbols. Second, after a transmitted symbol passes through a multipath channel, the guard interval converts a linear convolution of the channel and the transmitted symbol into a cyclic convolution of the channel and the transmitted symbol, so that a symbol receive end can eliminate the multipath effect of the channel by using a frequency domain equalization method.

In general, a cyclic prefix (CP) is used as a guard interval between symbols. The CP is a cyclic structure formed by copying a segment of data at the end (or referred to as a tail) of a data symbol to the start (or referred to as a header) of the symbol.

To perform flexible multiuser multiplexing, a stable frame structure needs to be maintained. To maintain a stable frame structure, a CP length is fixed. During implementation, a network device configures a same CP length for a plurality of users. However, channel conditions are different for different users, and therefore requirements for a CP length may also be different. To ensure performance of all users, a system selects a CP whose length is greater than a multipath delay of a user with large delay spreading. However, for a user with small delay spreading, an excessive CP causes unnecessary overheads.

Therefore, in the conventional technology, a guard interval between symbols cannot be flexibly configured based on a user requirement.

SUMMARY

This application provides a symbol processing method and apparatus, to flexibly configure a guard interval between symbols when a CP length is fixed.

According to a first aspect, a symbol processing method is provided. The method includes: sending a first transmitted symbol and a second transmitted symbol. The first transmitted symbol and the second transmitted symbol are consecutive in time domain, and the first transmitted symbol is located before the second transmitted symbol. A symbol component whose end location is a first reference point in the first transmitted symbol is the same as a symbol component whose end location is a second reference point in the second transmitted symbol, the first reference point represents an end location of a transmitted symbol, and the second reference point represents a location from which a CP is obtained through truncation in a transmitted symbol. The second transmitted symbol has a CP.

In this application, for the first transmitted symbol and the second transmitted symbol that are consecutive in time domain, the symbol component whose end location is the first reference point in the first transmitted symbol and the symbol component whose end location is the second reference point in the second transmitted symbol are enabled to be the same, so that a guard interval between symbols can be flexibly configured by controlling a length of a common symbol component between the first transmitted symbol and the second transmitted symbol.

In addition, it should be understood that the length of the common symbol component between the first transmitted symbol and the second transmitted symbol does not affect a frame structure of the transmitted symbol. Therefore, for users with different channel conditions, such common symbol components with different lengths are configured, so that a guard interval between symbols can be flexibly configured first, and then (frequency division, spatial, and time division) multiplexing can also be performed between users for which different guard intervals are configured.

Therefore, in this application, when a CP length is fixed, a guard interval between symbols can be flexibly configured, and a length of the guard interval can also be flexibly configured based on a user requirement.

According to a second aspect, a symbol processing method is provided. The method includes: obtaining a plurality of complex-valued symbols; dividing the plurality of complex-valued symbols into a plurality of sets, where each set corresponds to one transmitted symbol; and performing a copy operation on the plurality of sets, so that two sets corresponding to two transmitted symbols that are consecutive in time domain have some same complex-valued symbols.

In this application, a copy operation is performed on two sets corresponding to two transmitted symbols that are consecutive in time domain, so that the two sets have same complex-valued symbols. This helps generate the first transmitted symbol and the second transmitted symbol in the method provided in the first aspect. Therefore, in this application, a guard interval between symbols can be flexibly configured when a CP length is fixed.

With reference to the second aspect, in a possible implementation of the second aspect, the plurality of sets include a first set corresponding to a first transmitted symbol and a second set corresponding to a second transmitted symbol, the first transmitted symbol and the second transmitted symbol are consecutive in time domain, and the first transmitted symbol is located before the second transmitted symbol. The performing a copy operation on the plurality of sets includes: performing a first copy operation on the first set and the second set, so that both the first set and the second set have first complex-valued symbols, an end location of a first subset including the first complex-valued symbols in the first set corresponds to a first reference point of the first transmitted symbol, and an end location of a second subset including the first complex-valued symbols in the second set corresponds to a second reference point of the second transmitted symbol. The first reference point represents an end location of a transmitted symbol, and the second reference point represents a location from which a CP is obtained through truncation in a transmitted symbol.

The first complex-valued symbol may include a plurality of complex-valued symbols.

In this application, a copy operation is performed on the first set and the second set corresponding to the first transmitted symbol and the second transmitted symbol that are consecutive in time domain, so that both the first set and the second set have the first complex-valued symbols. In addition, the end location of the subset including the first complex-valued symbols in the first set corresponds to the first reference point of the first transmitted symbol, and the end location of the subset including the first complex-valued symbols in the second set corresponds to the second reference point of the second transmitted symbol, so that the first transmitted symbol and the second transmitted symbol in the method provided in the second aspect can be generated based on the first set and the second set obtained through the copy operation. Therefore, in this application, a guard interval between symbols can be flexibly configured when a CP length is fixed.

With reference to the second aspect, in a possible implementation of the second aspect, a time domain vector corresponding to the first subset is a subvector $x_l[1]$ in a time domain vector corresponding to the first set:

$$x_l[1]=[x_l(M-M_l^1), x_l(M-M_l^1+1), \ldots, x_l(M-1)]^T; \text{ and}$$

a time domain vector corresponding to the second subset is a subvector $x_{l+1}[2]$ in a time domain vector corresponding to the second set:

$$x_{l+1}[2]=[x_{l+1}(M-M_l^1-K), x_{l+1}(M-M_l^1-K+1), \ldots, x_{l+1}(M-K-1)]^T, \text{ where}$$

M represents dimensions of the time domain vectors separately corresponding to the first set and the second set, $M_l^1$ represents a length of a subset including the first complex-valued symbols, M−K−1 represents a time domain index of the second reference point of the second transmitted symbol in the time domain vector corresponding to the second set, and a value of K is related to a CP length.

With reference to the second aspect, in a possible implementation of the second aspect, the performing a copy operation on the first set and the second set includes: copying the first complex-valued symbols in the first set into the second set.

This copying manner may be referred to as backward copying.

With reference to the second aspect, in a possible implementation of the second aspect, the performing a copy operation on the first set and the second set includes: copying the first complex-valued symbols in the second set into the first set.

This copying manner may be referred to as forward copying.

With reference to the second aspect, in a possible implementation of the second aspect, the method further includes: separately performing a cyclic shift on the first set and the second set based on a same step and direction, so that the end location of the first subset corresponds to a location following the first reference point of the first transmitted symbol, and the end location of the second subset corresponds to a location following the second reference point of the second transmitted symbol.

When this application is applied to a wireless communication system using a discrete fourier transform-spread-orthogonal frequency division multiplexing (DFT-s-OFDM) waveform, the cyclic shift operation in this implementation may be performed on any one of the following occasions: before DFT; after DFT and before IFFT; and after IFFT and before a CP is added.

When this application is applied to a wireless communication system using a single carrier-quadrature amplitude modulation (SC-QAM) waveform, the cyclic shift operation in this implementation may be performed before a CP is added.

It should be understood that, in this application, by performing a cyclic shift on the sets obtained through the copy operation, impact on extension of a guard interval between symbols that is caused by an effect of filtering can be reduced to some extent.

With reference to the second aspect, in a possible implementation of the second aspect, the method further includes: performing a second copy operation on the first set and the second set, so that both the first set and the second set have second complex-valued symbols, a start location of a third subset including the second complex-valued symbols in the first set corresponds to a third reference point of the first transmitted symbol, and a start location of a fourth subset including the second complex-valued symbols in the second set corresponds to the second reference point of the second transmitted symbol. The third reference point represents a start location of a transmitted symbol.

The second complex-valued symbol may include a plurality of complex-valued symbols.

It should be understood that, in this application, impact on extension of a guard interval between symbols that is caused by an effect of filtering can be reduced to some extent.

Optionally, in an implementation, the first copy operation and the second copy operation may be performed simultaneously, in other words, the first copy operation and the second copy operation are combined into one copy operation for execution.

With reference to the second aspect, in a possible implementation of the second aspect, the plurality of sets include the first set corresponding to the first transmitted symbol and the second set corresponding to the second transmitted symbol, the first transmitted symbol and the second transmitted symbol are consecutive in time domain, and the first transmitted symbol is located before the second transmitted symbol. The performing a copy operation on the plurality of sets includes: performing a copy operation on the first set and the second set, so that both the first set and the second set have third complex-valued symbols, an end location of a subset including the third complex-valued symbols in the first set corresponds to a location following the first reference point of the first transmitted symbol, and an end location of a subset including the third complex-valued symbols in the second set corresponds to a location following the second reference point of the second transmitted symbol.

The third complex-valued symbol may include a plurality of complex-valued symbols.

It should be understood that, in this application, impact on extension of a guard interval between symbols that is caused by an effect of filtering can be reduced to some extent.

With reference to the second aspect, in a possible implementation of the second aspect, a copying manner is backward copying, the first transmitted symbol is a reference signal, and the second transmitted symbol is a non-reference signal.

It should be understood that, in this implementation, a guard interval between symbols can be flexibly configured, and integrity of a reference signal can also be ensured.

With reference to the second aspect, in a possible implementation of the second aspect, a copying manner is forward copying, the first transmitted symbol is a non-reference signal, and the second transmitted symbol is a reference signal.

Optionally, the reference signal in the foregoing some implementations is, for example, a demodulation reference signal (DMRS).

It should be understood that, in this implementation, a guard interval between symbols can be flexibly configured, and integrity of a reference signal can also be ensured.

With reference to the second aspect, in a possible implementation of the second aspect, the method further includes: processing the plurality of sets to obtain a plurality of transmitted symbols, where the plurality of transmitted symbols include the first transmitted symbol and the second transmitted symbol, the first transmitted symbol and the second transmitted symbol are consecutive in time domain, and the first transmitted symbol is located before the second transmitted symbol. A symbol component whose end location is the first reference point in the first transmitted symbol is the same as a symbol component whose end location is the second reference point in the second transmitted symbol, the first reference point represents an end location of a transmitted symbol, and the second reference point represents a location from which a CP is obtained through truncation in a transmitted symbol.

Therefore, in this application, when a CP length is fixed, a guard interval between symbols can be flexibly configured, and a length of the guard interval can also be flexibly configured based on a user requirement.

According to a third aspect, a symbol processing method is provided. The method includes: obtaining a plurality of complex-valued symbols; dividing the plurality of complex-valued symbols into a plurality of sets, where the plurality of sets include a first set and a second set that are the same, the first set corresponds to a first transmitted symbol, the second set corresponds to a second transmitted symbol, the first transmitted symbol and the second transmitted symbol are consecutive in time domain, and the first transmitted symbol is located before the second transmitted symbol; and performing a cyclic shift on the first set and/or the second set, so that complex-valued symbols in a first subset in the first set are the same as complex-valued symbols in a second subset in the second set. An end location of the first subset corresponds to a first reference point of the first transmitted symbol, and an end location of the second subset corresponds to a second reference point of the second transmitted symbol. The first reference point represents an end location of a transmitted symbol, and the second reference point represents a location from which a CP is obtained through truncation in a transmitted symbol.

Optionally, both the first transmitted symbol and the second transmitted symbol are reference signals. For example, the first transmitted symbol and the second transmitted symbol are DMRSs.

It should be understood that, in this application, no copy operation is performed on the first set and the second set, and when the transmitted symbols corresponding to the first set and the second set are reference signals, a guard interval between the reference signals can be flexibly configured while accuracy of the reference signals is ensured.

According to a fourth aspect, a symbol processing apparatus is provided. The apparatus is configured to perform the method provided in the first aspect, the second aspect, or the third aspect.

Optionally, the apparatus may include a module configured to perform the method provided in the first aspect, the second aspect, or the third aspect.

According to a fifth aspect, a symbol processing apparatus is provided. The apparatus includes a memory and a processor. The memory is configured to store instructions, the processor is configured to execute the instructions stored in the memory, and execution of the instructions stored in the memory enables the processor to perform the method provided in the first aspect, the second aspect, or the third aspect.

According to a sixth aspect, a chip is provided. The chip includes a processing module and a communication interface, the processing module is configured to control the communication interface to perform external communication, and the processing module is further configured to implement the method provided in the first aspect, the second aspect, or the third aspect.

According to a seventh aspect, a computer-readable storage medium is provided. The computer-readable storage medium stores a computer program; and when the computer program is executed by a computer, the computer is enabled to implement the method provided in the first aspect, the second aspect, or the third aspect.

According to an eighth aspect, a computer program product including instructions is provided. When the instructions are executed by a computer, the computer is enabled to implement the method provided in the first aspect, the second aspect, or the third aspect.

Therefore, in this application, when the CP length is fixed, the guard interval between symbols can be flexibly configured, and the length of the guard interval can also be flexibly configured based on the user requirement.

DESCRIPTION OF EMBODIMENTS

The following describes technical solutions of this application with reference to accompanying drawings.

Unless otherwise defined, all technical and scientific terms used in this specification have same meanings as those usually understood by a person skilled in the art of this application. The terms used in the specification of this application are merely for the purpose of describing specific embodiments, and are not intended to limit this application.

Compared with a multi-carrier waveform such as orthogonal frequency division multiplexing (OFDM), a single-carrier waveform such as DFT-s-OFDM or SC-QAM has a lower peak to average power ratio (PAPR). Therefore, in a case of a same power amplifier, the single-carrier waveform can provide larger output power and higher power amplification efficiency, and this improves coverage and reducing energy consumption. Therefore, single-carrier waveforms such as DFT-s-OFDM or SC-QAM are widely applied to various communication systems such as a long term evolution (LTE) system, a 5th generation (5G) system, or a new radio (NR) system.

DFT-s-OFDM is discrete fourier transform-spread-orthogonal frequency division multiplexing (DFT-s-OFDM). SC-QAM is single carrier-quadrature amplitude modulation (SC-QAM).

In both NR and LTE, the DFT-s-OFDM waveform uses a CP as a guard interval between symbols (DFT-s-OFDM symbols).

Figure 1:
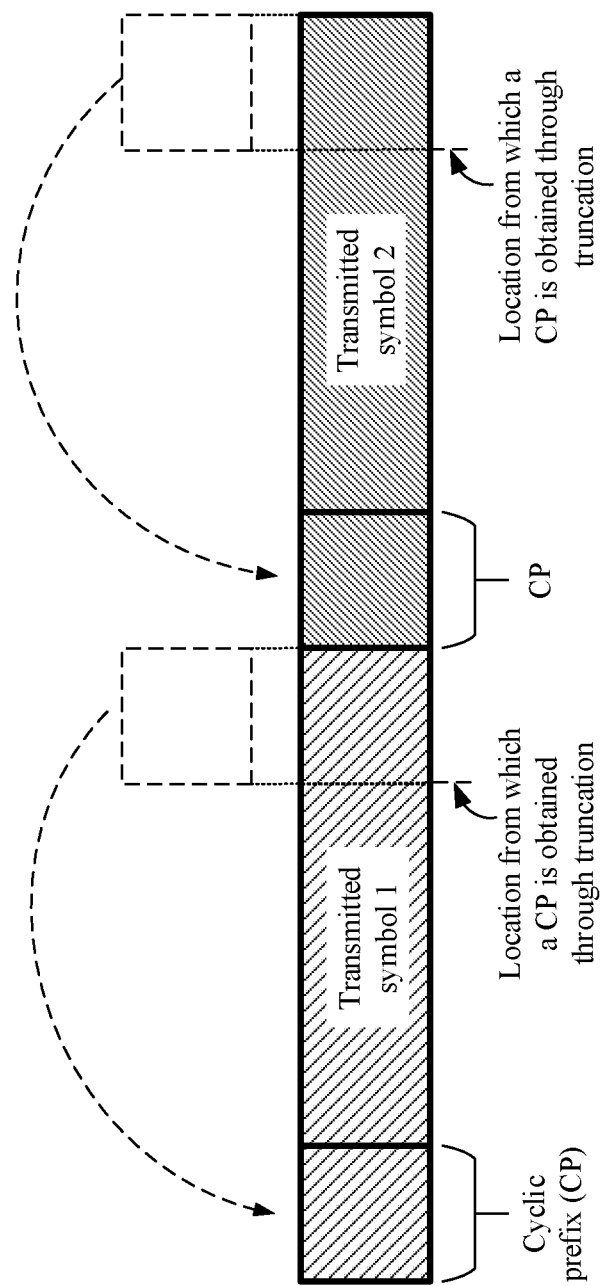
FIG. 1 and FIG. 2 are schematic diagrams of using a CP as a guard interval between symbols.

FIG. 1 is a schematic diagram of a time domain structure in which a CP is used as a guard interval between symbols. In FIG. 1, two transmitted symbols are provided: a transmitted symbol 1 and a transmitted symbol 2. A CP of the transmitted symbol 1 refers to a cyclic structure formed by copying a segment of transmitted symbol components between a location from which a CP is obtained through truncation and an end location in the transmitted symbol 1 to the start of the transmitted symbol 1. Similarly, a CP of the transmitted symbol 2 refers to a cyclic structure formed by copying a segment of transmitted symbol components between a location from which a CP is obtained through truncation and an end location in the transmitted symbol 2 to the start of the transmitted symbol 2.

The CP of the transmitted symbol 2 is used as a guard interval between the transmitted symbol 1 and the transmitted symbol 2, and the CP of the transmitted symbol 1 is used as a guard interval between the transmitted symbol 1 and a transmitted symbol (not shown in FIG. 1) preceding the transmitted symbol 1.

Figure 2:
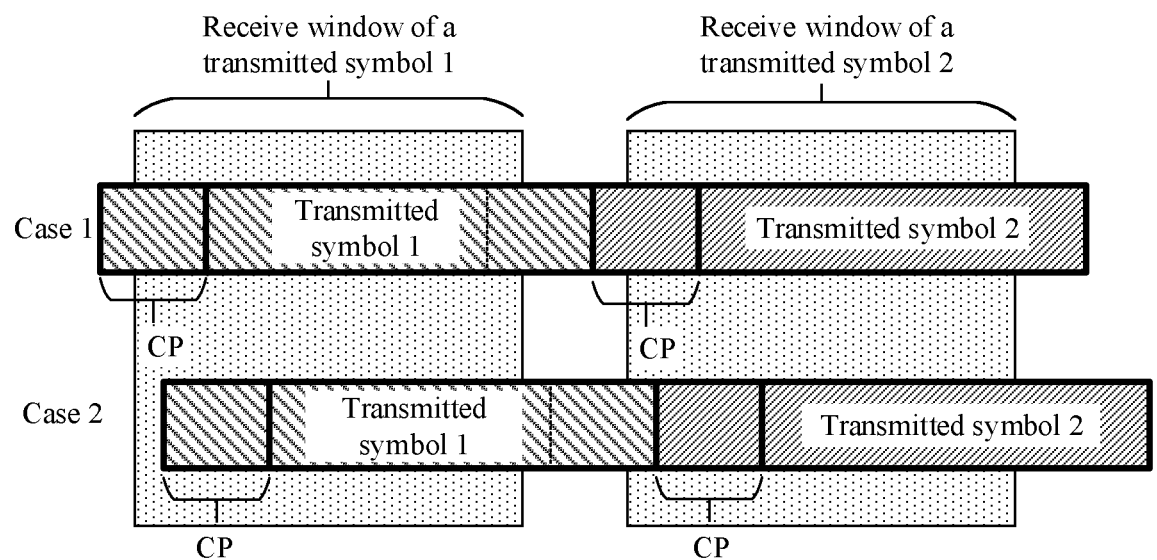

FIG. 2 shows receiving cases, at a receive end, of the transmitted symbol 1 and the transmitted symbol 2 shown in FIG. 1 after the transmitted symbol 1 and the transmitted symbol 2 are transmitted through a channel (FIG. 2 shows only a maximum multipath delay of the channel as an example).

Case 1 indicates that the maximum multipath delay of the channel does not exceed a CP length. In Case 1, because of protection of a CP, a receive window of none of transmitted symbols includes ISI of another transmitted symbol. As shown in FIG. 2, a receive window of the transmitted symbol 2 does not include the transmitted symbol 1, and therefore ISI of the transmitted symbol 1 can be avoided, and a receive window of the transmitted symbol 1 does not include the transmitted symbol (not shown in FIG. 2) preceding the transmitted symbol 1, and therefore the transmitted symbol 1 is not subject to ISI, either. In addition, in Case 1, in the receive window of each transmitted symbol, a received symbol is a cyclic convolution of the transmitted symbol and the channel, so that the receive end can eliminate a multipath effect of the channel by using a frequency domain equalization method.

Case 2 indicates that the maximum multipath delay of the channel exceeds a CP length. In Case 2, because the channel delay exceeds the CP length, a receive window of one transmitted symbol includes another transmitted symbol. As shown in FIG. 2, a receive window of the transmitted symbol 2 includes a segment of transmitted symbol components of the transmitted symbol 1, and therefore the transmitted symbol 2 is subject to ISI of the transmitted symbol 1, and a receive window of the transmitted symbol 1 may also include the transmitted symbol (not shown in FIG. 2) preceding the transmitted symbol 1, and therefore the transmitted symbol 1 is also subject to ISI. In addition, in Case 2, in a receive window of each transmitted symbol, a received symbol is no longer a cyclic convolution of the transmitted symbol and the channel. This is not helpful for the receive end to eliminate a multipath effect of the channel.

The transmitted symbol mentioned above represents a symbol sent by a transmit end, and the received symbol represents a symbol received by the receive end.

It can be learned from FIG. 2 that a CP length required by a channel condition in Case 2 is greater than a CP length required by a channel condition in Case 1. In other words, different channel conditions may also require different CP lengths.

It can be learned from FIG. 1 or FIG. 2 that a CP length affects a frame structure. Because of reasons such as complexity of a transceiver and out-of-band interference, flexibility of performing (frequency division, spatial, and time division) multiplexing between users with different CP lengths is relatively poor. In an implementation, to perform flexible multiuser multiplexing, a network device usually configures a same CP length for different users. However, as shown in FIG. 2, user equipment with different channel conditions may also require different CP lengths. In the conventional technology, to overcome the problem shown in FIG. 2, in other words, to ensure performance of all users with different channel conditions, a system selects, as CP lengths of all users, CP lengths greater than a channel delay of a large-delay user. However, for a small-delay user, an excessive CP length causes unnecessary signaling overheads.

It can be learned from the foregoing descriptions that, in the conventional technology, a guard interval between symbols cannot be flexibly configured based on a user requirement.

This application provides a symbol processing method and apparatus, so that a guard interval between symbols can be flexibly configured when a CP length is fixed.

The technical solutions in the embodiments of this application may be applied to various communication systems, for example, a cellular communication system such as LTE and evolution of the cellular communication system, a 5G system, an NR system, a machine-to-machine (M2M) system, and another future evolved communication system.

An embodiment of this application provides a symbol processing method. The method includes: sending a first transmitted symbol and a second transmitted symbol that are consecutive in time domain, where the first transmitted symbol is located before the second transmitted symbol, a symbol component whose end location is a first reference point in the first transmitted symbol is the same as a symbol component whose end location is a second reference point in the second transmitted symbol, the first reference point represents an end location of a transmitted symbol, and the second reference point represents a location from which a CP is obtained through truncation in a transmitted symbol. The second transmitted symbol has a CP.

Figure 3:
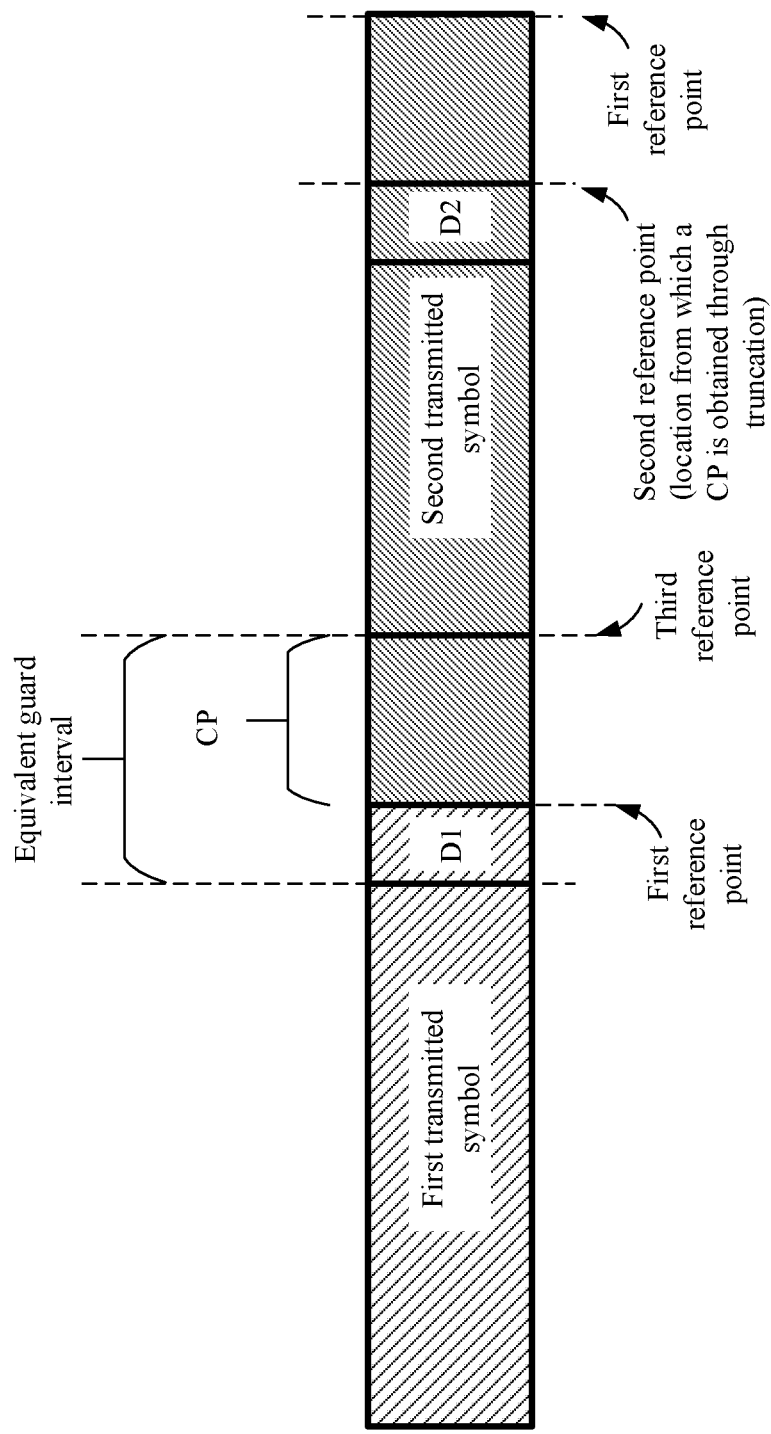
FIG. 3 is a schematic diagram of a time domain structure of a transmitted symbol according to an embodiment of this application.

For example, FIG. 3 is a schematic diagram of time domain structures of a first transmitted symbol and a second transmitted symbol. A symbol component D1 in the first transmitted symbol is the same as a symbol component D2 in the second transmitted symbol, an end location of the symbol component D1 in the first transmitted symbol is a first reference point, and an end location of the symbol component D2 in the second transmitted symbol is a second reference point. The first reference point represents an end location of a transmitted symbol, and the second reference point represents a location from which a CP is obtained through truncation in a transmitted symbol.

That a symbol component D1 in the first transmitted symbol is the same as a symbol component D2 in the second transmitted symbol includes: Content included in the symbol component D1 and the symbol component D2 is the same, and time lengths of the symbol component D1 and the symbol component D2 are the same. That content included in the symbol component D1 and the symbol component D2 is the same may be understood as follows: Complex-valued symbols separately corresponding to the symbol component D1 and the symbol component D2 are the same before the symbol components are generated.

It should be noted that, in the foregoing descriptions with reference to FIG. 3, "a symbol component D1 in the first transmitted symbol is the same as a symbol component D2 in the second transmitted symbol" is mentioned. Herein, "the same" is not necessarily "absolutely the same", and may alternatively indicate "approximately the same". It should be understood that there may be a slight deviation between the symbol component D1 in the first transmitted symbol and the symbol component D2 in the second transmitted symbol because of an effect of filtering.

The symbol processing method provided in this application may be implemented by a transmit end, for example, may be implemented by a transmitter or a circuit used to implement a transmitter.

The transmitted symbol in this embodiment of this application may be an uplink waveform symbol and/or a downlink waveform symbol in a communication system.

Figure 4:
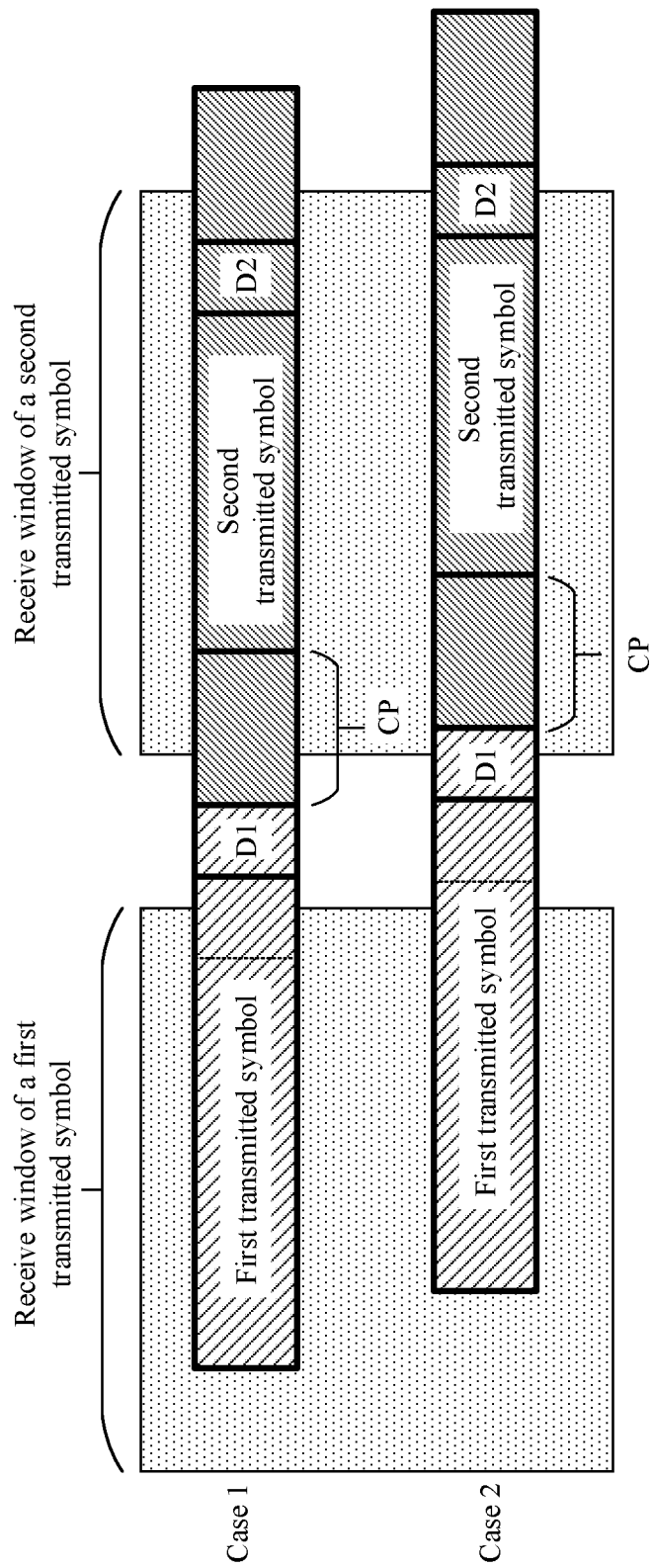
FIG. 4 is another schematic diagram of a time domain structure of a transmitted symbol according to an embodiment of this application.

FIG. 4 shows receiving cases, at a receive end (corresponding to the transmit end), of the first transmitted symbol and the second transmitted symbol shown in FIG. 3 (after the first transmitted symbol and the second transmitted symbol are transmitted through a channel).

Case 1 indicates that a maximum multipath delay of the channel does not exceed a CP length. In Case 1, because of protection of a CP, a receive window of none of transmitted symbols includes ISI of another transmitted symbol. As shown in FIG. 4, a receive window of the second transmitted symbol does not include a component of the first transmitted symbol, so that ISI of the first transmitted symbol can be avoided.

Case 2 indicates that a maximum multipath delay of the channel exceeds a CP length. In Case 2, because the channel delay exceeds the CP length, a receive window of one transmitted symbol may include another transmitted symbol. As shown in FIG. 4, the symbol component D1 in the first transmitted symbol enters the receive window of the second transmitted symbol. However, because the symbol component D1 in the first transmitted symbol is the same as the symbol component D2 in the second transmitted symbol, that the symbol component D1 in the first transmitted symbol enters the receive window of the second transmitted symbol equivalently means that the symbol component D2 in the second transmitted symbol enters the receive window of the second transmitted symbol. In addition, because the symbol component D2 and a symbol component used as a CP are consecutive in the second transmitted symbol, based on a principle that a CP of the second transmitted symbol does not cause ISI to the second transmitted symbol, the symbol component D1 that is in the first transmitted symbol and that enters the receive window of the second transmitted symbol does not cause ISI to the second transmitted symbol, either.

It can be learned from FIG. 3 and FIG. 4 that even if a CP length is fixed, a length of the symbol component D1 may be flexibly configured (which equivalently means that a length of the symbol component D2 is flexibly configured), so that a sum of the length of the symbol component D1 and the CP length is greater than a channel delay, and therefore a multipath effect of the channel can be resisted.

For better understanding instead of limitation, in the examples of FIG. 3 and FIG. 4, the symbol component D1 in the first transmitted symbol and the CP of the second transmitted symbol may be considered together as an equivalent guard interval between the first transmitted symbol and the second transmitted symbol, as shown in FIG. 3.

In this application, for the first transmitted symbol and the second transmitted symbol that are consecutive in time domain, the symbol component whose end location is the first reference point in the first transmitted symbol and the symbol component whose end location is the second reference point in the second transmitted symbol are enabled to be the same, so that a guard interval between symbols can be flexibly configured by controlling a length of a common symbol component between the first transmitted symbol and the second transmitted symbol.

In addition, it should be understood that the length of the common symbol component between the first transmitted symbol and the second transmitted symbol does not affect a frame structure of the transmitted symbol. Therefore, for users with different channel conditions, such common symbol components with different lengths are configured, so that a guard interval between symbols can be flexibly configured first, and then (frequency division, spatial, and time division) multiplexing can also be performed between users for which different guard intervals are configured.

Therefore, in this application, when a CP length is fixed, a guard interval between symbols can be flexibly configured, and a length of the guard interval can also be flexibly configured based on a user requirement.

It should be noted that all lengths, for example, a CP length and a length of a symbol component, mentioned in this specification are time lengths.

It should be further noted that, for ease of understanding and description instead of limitation, in this specification, three reference points are defined for the transmitted symbol: the first reference point, the second reference point, and a third reference point (to be mentioned in the following embodiments), as shown in FIG. 3. The first reference point represents an end location of a transmitted symbol, the second reference point represents a location from which a CP is obtained through truncation in a transmitted symbol, and the third reference point represents a start location of a transmitted symbol. The start location of the transmitted symbol is the start location of the transmitted symbol, and is not a start location of a CP of the transmitted symbol. Alternatively, it may be understood from another perspective that the start location of the transmitted symbol is an end location of a CP of the transmitted symbol.

It should be further noted that all locations mentioned in this specification are time domain locations.

With reference to FIG. 3 and FIG. 4, the foregoing describes time domain structures of transmitted symbols (for example, the first transmitted symbol and the second transmitted symbol described above) sent by the transmit end. The following describes content related to a process of generating a transmitted symbol.

Figure 5:
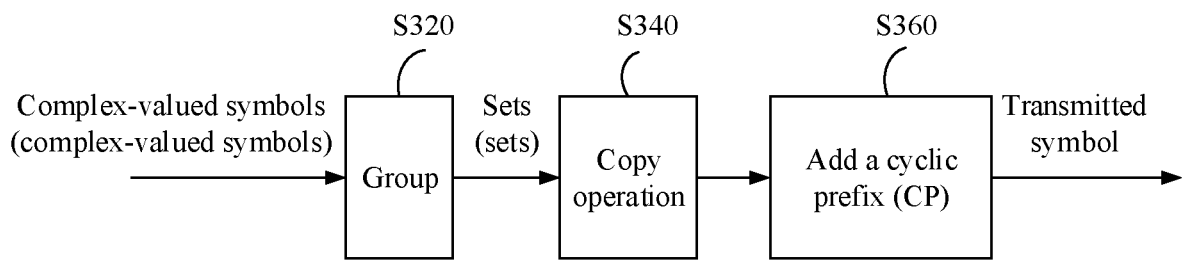
FIG. 5, FIG. 6, and FIG. 7 are basic flowcharts of symbol processing according to an embodiment of this application.

FIG. 5 is a schematic diagram of a basic procedure of symbol processing according to an embodiment of this application. As shown in FIG. 5, the procedure includes the following steps S320, S340, and S360.

S320: Group a plurality of complex-valued symbols (complex-valued symbols) to obtain a plurality of sets (sets), where each set corresponds to one transmitted symbol.

Alternatively, a plurality of complex-valued symbols are divided into (be divided into) a plurality of sets, and each set corresponds to one transmitted symbol.

The plurality of complex-valued symbols may include a modulated symbol obtained by modulating an encoded bit stream.

A modulation scheme for modulating the encoded bit stream may include pi/2-binary phase shift keying (BPSK), quadrature phase shift keying (QPSK), 16 quadrature amplitude modulation (QAM), 64QAM, 256QAM, phase shift keying (PSK), amplitude phase shift keying (APSK), non-uniform QAM, or the like.

Alternatively, the plurality of complex-valued symbols may further include a reference signal sampling point. For example, the reference signal sampling point may include a phase tracking reference signal (PTRS) sampling point.

That each set corresponds to one transmitted symbol means that each finally generated transmitted symbol is generated based on a corresponding set.

S340: Perform a complex-valued symbol copy operation on the plurality of sets obtained in step S320.

S360: Add a CP based on the sets obtained through the copy operation in step S340, to obtain a transmitted symbol (or add a CP based on the sets obtained through the copy operation in step S340, and then perform another operation to obtain a transmitted symbol, where the another operation described herein includes but is not limited to fast fourier transform, carrier mapping, sampling, filtering, or the like).

For two sets corresponding to two transmitted symbols that are consecutive in time domain, the copy operation in step 340 enables the two sets to have some same complex-valued symbols.

The following describes the copy operation in step 340.

For ease of distinguishing instead of limitation, the following agreement on names of signals is made in this specification: Signals to be grouped (or divided) into sets are referred to as complex-valued symbols. A signal obtained by grouping (or dividing) complex-valued symbols is referred to as a set. A set including some complex-valued symbols in the set is referred to as a subset. A signal sent by a transmit end is referred to as a transmitted symbol.

It should be understood that the names are only for ease of understanding and distinguishing instead of limitation. For example, in a future technology evolution process, signals obtained at different stages of a symbol generation procedure may have other names.

The transmitted symbol in this embodiment of this application may be a symbol of a single-carrier waveform.

For example, the transmitted symbol is a DFT-s-OFDM symbol. The DFT-s-OFDM symbol represents a single-carrier symbol whose waveform is a DFT-s-OFDM waveform.

For another example, the transmitted symbol is an SC-QAM symbol. The SC-QAM symbol represents a single-carrier symbol whose waveform is an SC-QAM waveform.

In the following descriptions, a wireless communication system to which the DFT-s-OFDM waveform is applicable in this application is denoted as an application scenario 1, and a wireless communication system to which the SC-QAM waveform is applicable in this application is denoted as an application scenario 2.

Figure 6:
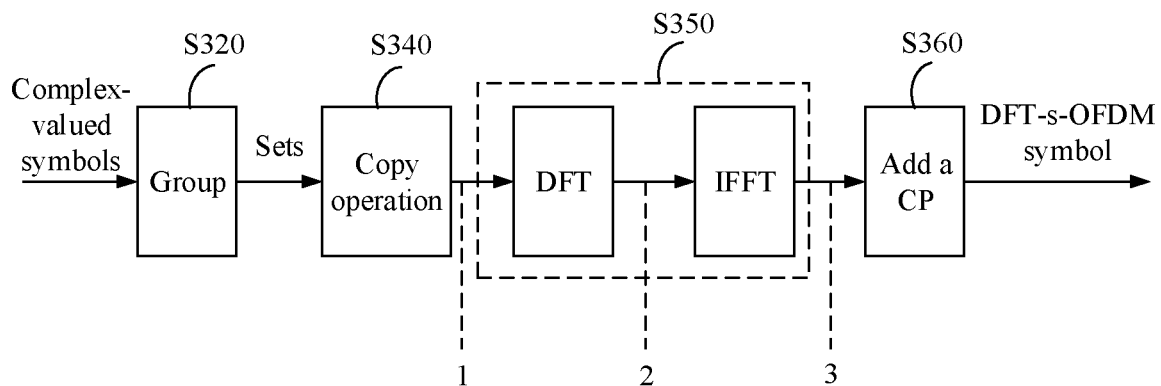

Optionally, an application scenario of this application is the application scenario 1, in other words, the transmitted symbol is a DFT-s-OFDM symbol. As shown in FIG. 6, step S350 may be further included between step S340 and step S360.

In step S350, a discrete fourier transform (DFT) operation and an inverse fast fourier transform (IFFT) operation are included.

For example, in step S350, a transmitter performs M-point DFT on the sets obtained through the copy operation, then maps M-point frequency domain elements to M consecutive subcarriers (not shown in FIG. 6), and performs IFFT on a frequency domain signal after the subcarrier mapping. The IFFT is performed after the subcarrier mapping. The DFT may also be referred to as frequency domain precoding.

In the embodiment shown in FIG. 6, step 360 includes: adding a CP to a signal obtained through the IFFT to obtain a DFT-s-OFDM symbol.

Optionally, step S350 further includes a frequency domain spectrum shaping (FDSS) operation.

For example, in step S350, the transmitter performs M-point DFT on the sets obtained through the copy operation, performs cyclic extension and frequency domain filtering (namely, the FDSS operation) on M-point frequency domain elements obtained through the DFT, then maps the frequency domain elements obtained through the FDSS operation to M1 (M1≥M) consecutive subcarriers, and performs IFFT on a frequency domain signal after the subcarrier mapping.

It should be understood that, in the application scenario 1, the copy operation on the sets is performed before the DFT.

Figure 7:
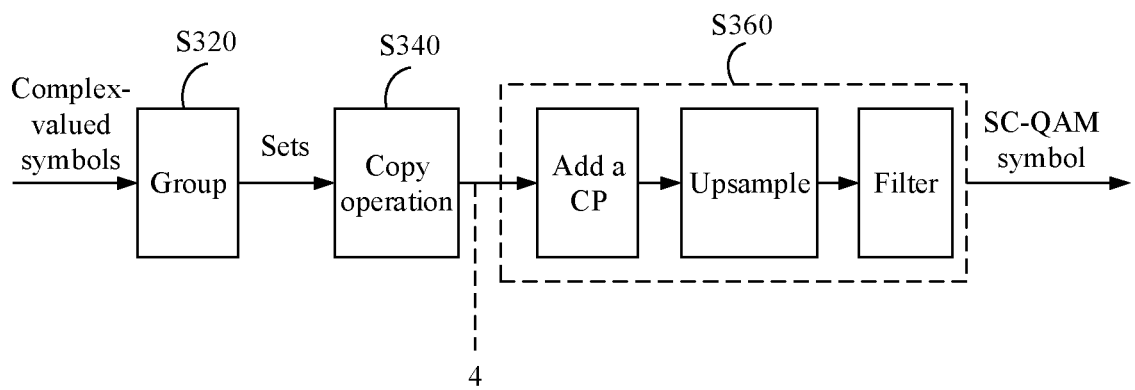

Optionally, an application scenario of this application is the application scenario 2, in other words, the transmitted symbol is an SC-QAM symbol. As shown in FIG. 7, in step S360, not only the operation of adding a CP is included, but also upsampling and filtering are included.

For example, in step S360, a transmitter adds a CP to the sets obtained through the copy operation, to obtain a signal obtained after the CP is added, and then performs upsampling and filtering on the signal obtained after the CP is added, to finally obtain an SC-QAM symbol.

It should be understood that, in the application scenario 2, the copy operation on the sets is performed before the CP is added.

Figure 8:
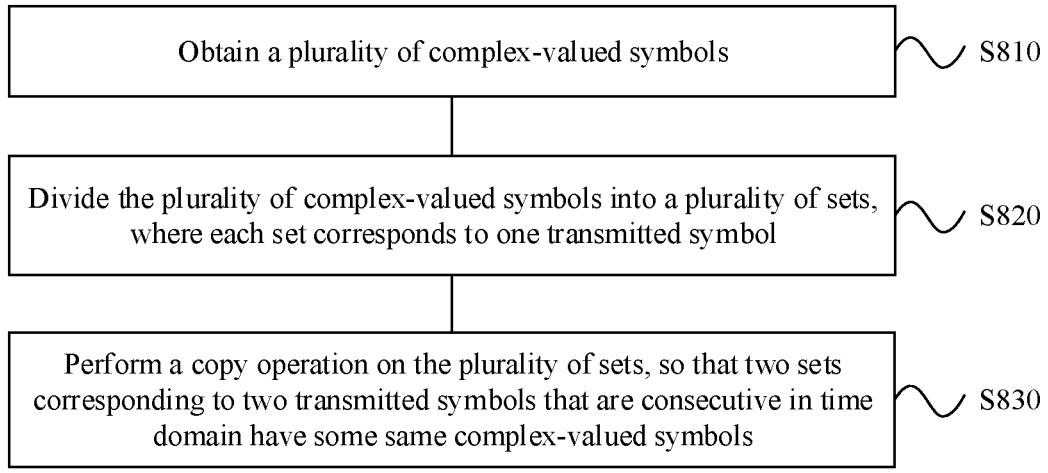
FIG. 8 is a schematic flowchart of a symbol processing method according to an embodiment of this application.

FIG. 8 is a schematic flowchart of a symbol processing method according to an embodiment of this application. The method includes the following steps S810 to S830.

S810: Obtain a plurality of complex-valued symbols.

The plurality of complex-valued symbols may include a modulated symbol obtained by modulating an encoded bit stream.

Optionally, the plurality of complex-valued symbols may further include a reference signal sampling point. For example, the reference signal sampling point may include a PTRS sampling point.

S820: Divide the plurality of complex-valued symbols into a plurality of sets, or in other words, group the plurality of complex-valued symbols to obtain a plurality of sets.

Each set corresponds to one transmitted symbol. For example, each set corresponds to one DFT-s-OFDM symbol or SC-QAM symbol.

Each set may include several complex-valued symbols.

For example, each set may be considered as one multi-dimensional time domain vector, and complex-valued symbols in the set may be considered as elements in the time domain vector.

Step S820 corresponds to step S320 shown in FIG. 5, FIG. 6, and FIG. 7.

S830: Perform a copy operation on the plurality of sets, so that two sets corresponding to two transmitted symbols that are consecutive in time domain have some same complex-valued symbols.

Step S830 corresponds to step S340 shown in FIG. 5 to FIG. 7.

It should be understood that, in the application scenario 1, step S830 is performed before DFT, and in the application scenario 2, step S830 is performed before a CP is added.

It should be further understood that, because two sets corresponding to two transmitted symbols that are consecutive in time domain have some same complex-valued symbols, time domain structures, shown in FIG. 3, of the two transmitted symbols corresponding to the two sets can be implemented to some extent.

Therefore, in this embodiment of this application, a copy operation is performed on two sets corresponding to two transmitted symbols that are consecutive in time domain, so that the two sets have same complex-valued symbols. This helps generate transmitted symbols whose time domain structures are shown in FIG. 3. In this way, a guard interval between symbols can be flexibly configured when a CP length is fixed.

For ease of understanding and description, in this application, a first transmitted symbol and a second transmitted symbol that are consecutive in time domain are used as examples for description. It should be understood that the symbol processing method provided in this application is applicable to any two or more transmitted symbols that are consecutive in time domain in a signal stream transmitted by a transmit end.

In step S830, a copy operation may be performed on the sets in a plurality of manners. This is described below.

For ease of understanding and description of the copy operation on the sets, the following first describes an association relationship between a set and a transmitted symbol.

For ease of description instead of limitation, three reference points are defined for the transmitted symbol: a first reference point, a second reference point, and a third reference point, as shown in FIG. 3. The first reference point represents an end location of a transmitted symbol, the second reference point represents a location from which a CP is obtained through truncation in a transmitted symbol, and the third reference point represents a start location of a transmitted symbol.

The following separately uses the application scenario 1 and the application scenario 2 as examples for description.

(1) Application scenario 1: The transmitted symbol is a DFT-s-OFDM symbol. In the application scenario 1, a symbol processing procedure is shown in FIG. 6.

Assuming (denoted as an assumption 1) that the transmit end performs DFT on M points, a dimension of a time domain vector on which DFT needs to be performed should be M. The time domain vector may be denoted as follows:

$$x_l = [x_l(0), x_l(1), \ldots, x_l(M-1)]T, \text{ where}$$

$x_l$ represents the time domain vector.

The time domain vector $x_l$ includes M elements, and time domain indexes of the first element to the last element are $0, 1, \ldots,$ and $M-1$.

Assuming (denoted as an assumption 2) that the transmit end performs DFT on M points (consistent with the assumption 1), a size of IFFT performed by the transmit end is N, and a quantity of sampling points of a CP is P, a quantity of points that may be equivalent to a length occupied by the CP before DFT is $K = P/N \cdot M$.

If P is not dividable by N, a calculation result of K is a non-integer. In this case, rounding needs to be performed on the calculation result of K, that is, $K = \lfloor (P/N) \cdot M \rfloor$, where $\lfloor (P/N) \cdot M \rfloor$ represents rounding down $(P/N) \cdot M$. It should be understood that the rounding manner herein may be alternatively rounding up, rounding off, or the like.

It should be understood that the quantity P of sampling points of the CP may be obtained based on a CP length.

Based on the foregoing assumptions, a time domain index of a first reference point of the DFT-s-OFDM symbol in the time domain vector $x_l$ is $M-1$, a time domain index of a second reference point of the DFT-s-OFDM symbol in the time domain vector $x_l$ is $M-K-1$, and a time domain index of a third reference point of the DFT-s-OFDM symbol in the time domain vector $x_l$ is 0.

(2) Application scenario 2: The transmitted symbol is an SC-QAM symbol. As shown in FIG. 7, in a process of generating the SC-QAM symbol, neither DFT nor IFFT is included before a CP is added, and upsampling and filtering are performed after the CP is added. Therefore, a quantity that is of points in a time domain vector and that is equivalent to a CP length may be directly obtained based on the CP length. Therefore, a transmitter may directly obtain an equivalent CP length value K1. The equivalent CP length value K1 may be obtained based on the CP length.

Assuming that a time domain vector before a CP is added is the M-dimensional time domain vector $x_l$ described in the application scenario 1, and an equivalent CP length value is K1, a time domain index of a first reference point of the SC-QAM symbol in the time domain vector $x_l$ is $M-1$, a time domain index of a second reference point of the SC-QAM symbol in the time domain vector $x_l$ is $M-K1-1$, and a time domain index of a third reference point of the SC-QAM symbol in the time domain vector $x_l$ is 0.

As described above, a set may be considered as a multi-dimensional time domain vector. The time domain vector $x_l$ in the foregoing example may represent a time domain vector corresponding to a set. An element in the time domain vector $x_l$ corresponds to a complex-valued symbol in the set. A time domain index of the element in the time domain vector $x_l$ corresponds to a location, in the set, of the complex-valued symbol in the set.

The foregoing example indicates that there is a correspondence between a time domain index of an element in the time domain vector $x_l$ and a time domain location (for example, the first reference point, the second reference point, or the third reference point) in a transmitted symbol corresponding to the time domain vector $x_l$. Therefore, there is also a correspondence between a location of a complex-valued symbol in a set and a location in a transmitted symbol corresponding to the set.

Figure 9:
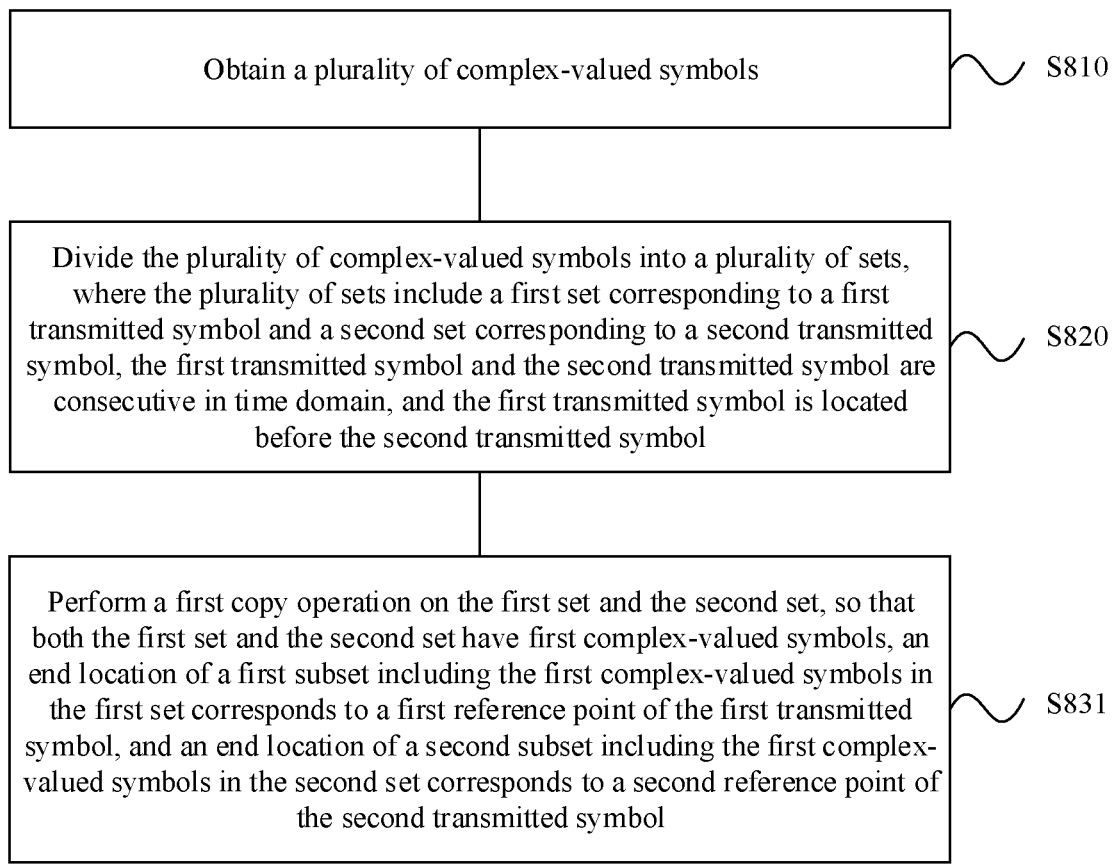
FIG. 9 is another schematic flowchart of a symbol processing method according to an embodiment of this application.

As shown in FIG. 9, optionally, in the embodiment shown in FIG. 8, the plurality of sets obtained in step S820 include a first set corresponding to the first transmitted symbol and a second set corresponding to the second transmitted symbol, the first transmitted symbol and the second transmitted symbol are consecutive in time domain, and the first transmitted symbol is located before the second transmitted symbol. Step S830 includes step S831.

Step S831: Perform a first copy operation on the first set and the second set, so that both the first set and the second set have first complex-valued symbols, an end location of a first subset E11 including the first complex-valued symbols in the first set corresponds to a first reference point of the first transmitted symbol, and an end location of a second subset E21 including the first complex-valued symbols in the second set corresponds to a second reference point of the second transmitted symbol, where the first reference point represents an end location of a transmitted symbol, and the second reference point represents a location from which a CP is obtained through truncation in a transmitted symbol.

It should be understood that the first complex-valued symbol may include a plurality of complex-valued symbols.

For example, a time domain vector corresponding to the first subset E11 is the following subvector $x_l[1]$ in a time domain vector $x_l$ corresponding to the first set:

$$x_l[1]=[x_l(M-M_l^1), x_l(M-M_l^1+1), \ldots, x_l(M-1)]^T; \text{ and}$$

a time domain vector corresponding to the second subset E21 is the following subvector $x_{l+1}[2]$ in a time domain vector $x_{l+1}$ corresponding to the second set:

$$x_{l+1}[2]=[x_{l+1}(M-M_l^1-K), x_{l+1}(M-M_l^1-K+1), \ldots, x_{l+1}(M-K-1)]^T,$$

where

M represents dimensions of the time domain vector $x_l$ corresponding to the first set and the time domain vector $x_{l+1}$ corresponding to the second set, $M_l^1$ represents a length of a subset including same complex-valued symbols included in the first set and the second set, M−K−1 represents a time domain index of the second reference point of the second transmitted symbol in the time domain vector corresponding to the second set, and a value of K is related to a CP length. For example, the value of K is determined based on the CP length.

It should be understood that in the application scenario 1, K in this example is calculated based on K=P/N·M (refer to the foregoing descriptions). In the application scenario 2, K in this example is equal to the equivalent CP length value K1.

It should be understood that in this example, the subvector $x_l[1]$ in the time domain vector $x_l$ corresponding to the first set is the same as an element included in the first subset E11 in the first set, and the subvector $x_{l+1}[2]$ in the time domain vector $x_{l+1}$ corresponding to the second set is the same as an element included in the second subset E21 in the second set.

It can be learned from the association relationship, described above, between a set and a transmitted symbol that, by performing the copy operation in step S831 on the first set and the second set, the first transmitted symbol corresponding to the first set and the second transmitted symbol corresponding to the second set may have time domain structures shown in FIG. 3.

For example, time domain structures of the first transmitted symbol corresponding to the first set and the second transmitted symbol corresponding to the second set are shown in FIG. 3, the first subset E11 in the first set may correspond to a symbol component D1 in the first transmitted symbol, and the second subset E21 in the second set may correspond to a symbol component D2 in the second transmitted symbol.

Therefore, in this embodiment of this application, a copy operation is performed on the first set and the second set corresponding to the first transmitted symbol and the second transmitted symbol that are consecutive in time domain, so that both the first set and the second set have the first complex-valued symbols. In addition, an end location of a subset including the first complex-valued symbols in the first set corresponds to the first reference point of the first transmitted symbol, and an end location of a subset including the first complex-valued symbols in the second set corresponds to the second reference point of the second transmitted symbol, so that the first transmitted symbol and the second transmitted symbol whose time domain structures are shown in FIG. 3 can be generated based on the first set and the second set obtained through the copy operation. Therefore, in this embodiment of this application, a guard interval between symbols can be flexibly configured when a CP length is fixed.

It should be noted that the first copy operation performed on the first set and the second set in step S831 may also be understood as mapping the first complex-valued symbols in the first set and the second set.

Optionally, in an implementation of step S831, the first complex-valued symbols in the first set are copied into the second set.

For example, a time domain vector corresponding to a first subset including the first complex-valued symbols copied in the first set is $x_l[1]$ described above, and a time domain vector corresponding to a second subset including the first complex-valued symbols copied into the second set from the first set is $x_{l+1}[2]$ described above.

This copying manner may be referred to as backward copying.

For example, that time domain structures of the first transmitted symbol corresponding to the first set and the second transmitted symbol corresponding to the second set are shown in FIG. 3 may equivalently mean that the symbol component D1 in the first transmitted symbol is copied into the second transmitted symbol and the symbol component D2 in the second transmitted symbol comes from the symbol component D1 in the first transmitted symbol.

Optionally, in another implementation of step S831, the first complex-valued symbols in the second set are copied into the first set.

For example, a time domain vector corresponding to a second subset including the first complex-valued symbols copied in the second set is $x_{l+1}[2]$ described above, and a time domain vector corresponding to a first subset including the first complex-valued symbols copied into the first set from the second set is $x_l[1]$ described above.

This copying manner may be referred to as forward copying.

For example, that time domain structures of the first transmitted symbol corresponding to the first set and the second transmitted symbol corresponding to the second set are shown in FIG. 3 may equivalently mean that the symbol component D2 in the second transmitted symbol is copied into the first transmitted symbol and the symbol component D1 in the first transmitted symbol comes from the symbol component D2 in the second transmitted symbol.

Figure 10:
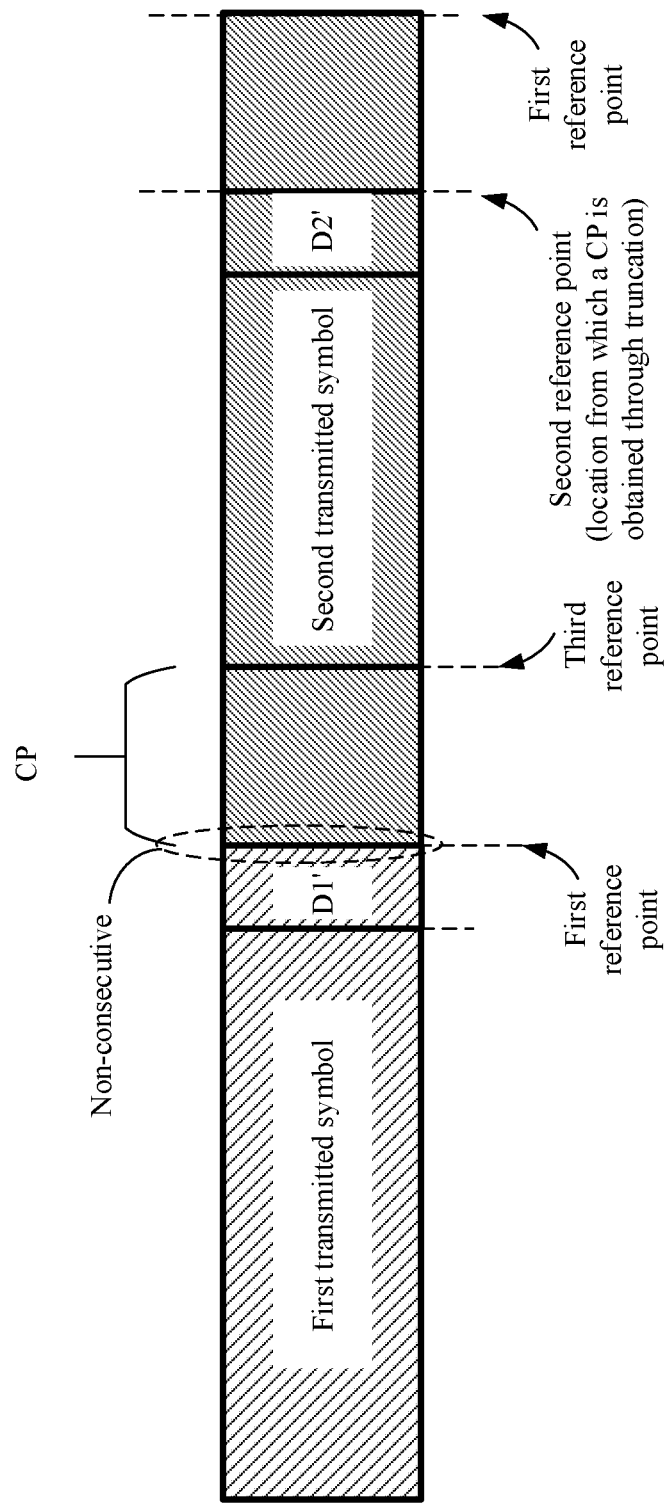
FIG. 10 is a schematic diagram of a poor extension effect of a guard interval between symbols.

For the embodiment shown in FIG. 9, in an ideal case, the first transmitted symbol generated based on the first set and the second transmitted symbol generated based on the second set may have the time domain structures shown in FIG. 3, in other words, the symbol component D1 whose end location is the first reference point in the first transmitted symbol is the same as the symbol component D2 whose end location is the second reference point in the second transmitted symbol. However, in some cases, an extension effect of a guard interval between symbols may be poor because of an effect of filtering. For example, time domain structures of the first transmitted symbol and the second transmitted symbol that are generated based on the first set and the second set in the embodiment in FIG. 9 are shown in FIG. 10, and a symbol component D1' whose end location is the first reference point in the first transmitted symbol is different from a symbol component D2' whose end location is the second reference point in the second transmitted symbol. Consequently, a CP of the second transmitted symbol and the symbol component D1' in the first symbol are non-consecutive, affecting extension of a guard interval between symbols.

To resolve this problem, this application provides the following embodiments.

Figure 11:
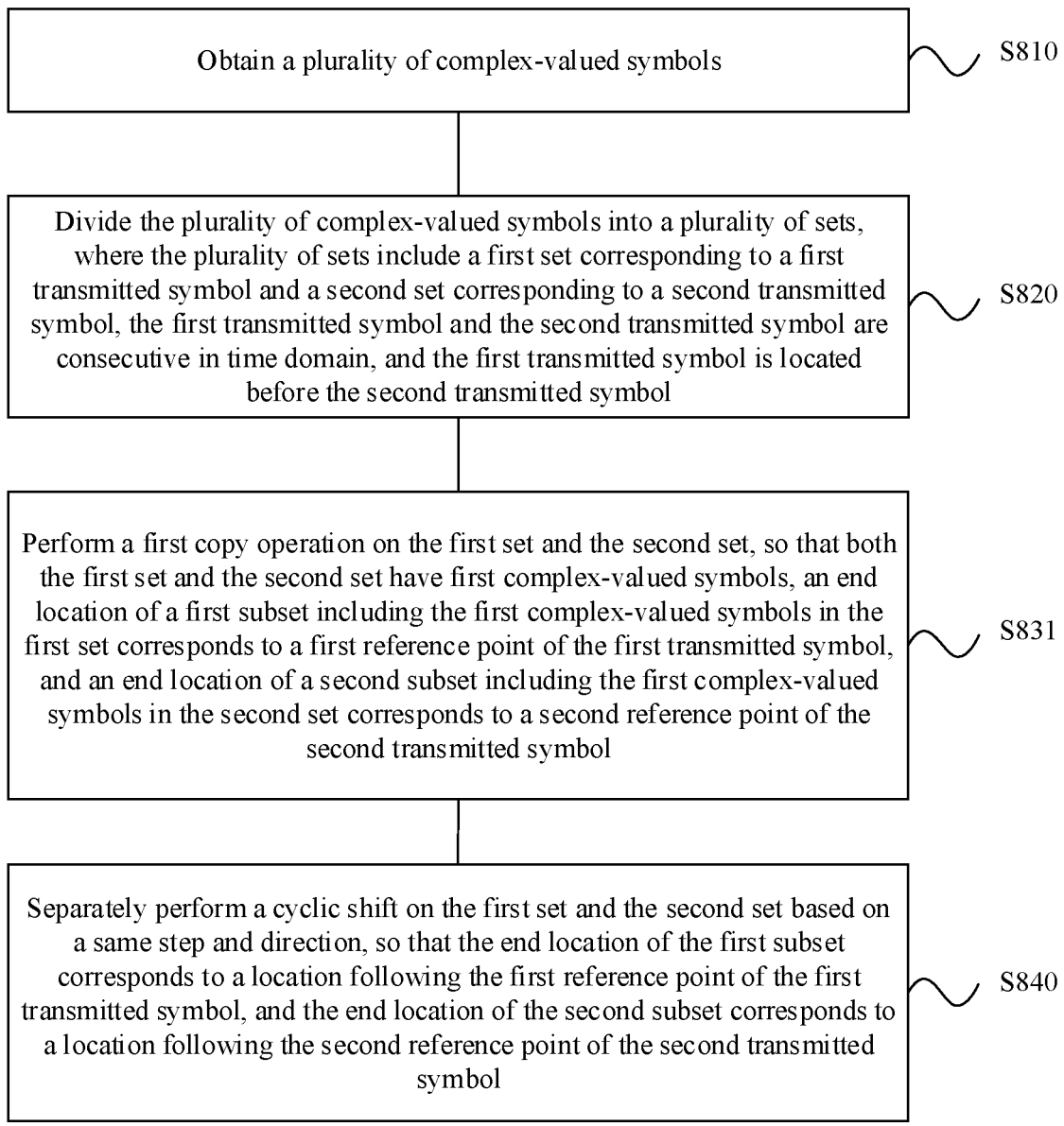
FIG. 11 is still another schematic flowchart of a symbol processing method according to an embodiment of this application.

As shown in FIG. 11, optionally, in an embodiment, in the embodiment shown in FIG. 9, after step S831, the method further includes step S840.

Step S840: Separately perform a cyclic shift on the first set and the second set based on a same step and direction, so that the end location of the first subset E11 corresponds to a location following the first reference point of the first transmitted symbol, and the end location of the second subset E21 corresponds to a location following the second reference point of the second transmitted symbol.

It should be understood that in step S840, because a cyclic shift is performed on the first set and the second set based on the same step and direction, a symbol component whose end location is the first reference point in the first transmitted symbol can be the same as a symbol component whose end location is the second reference point in the second transmitted symbol.

Figure 12:
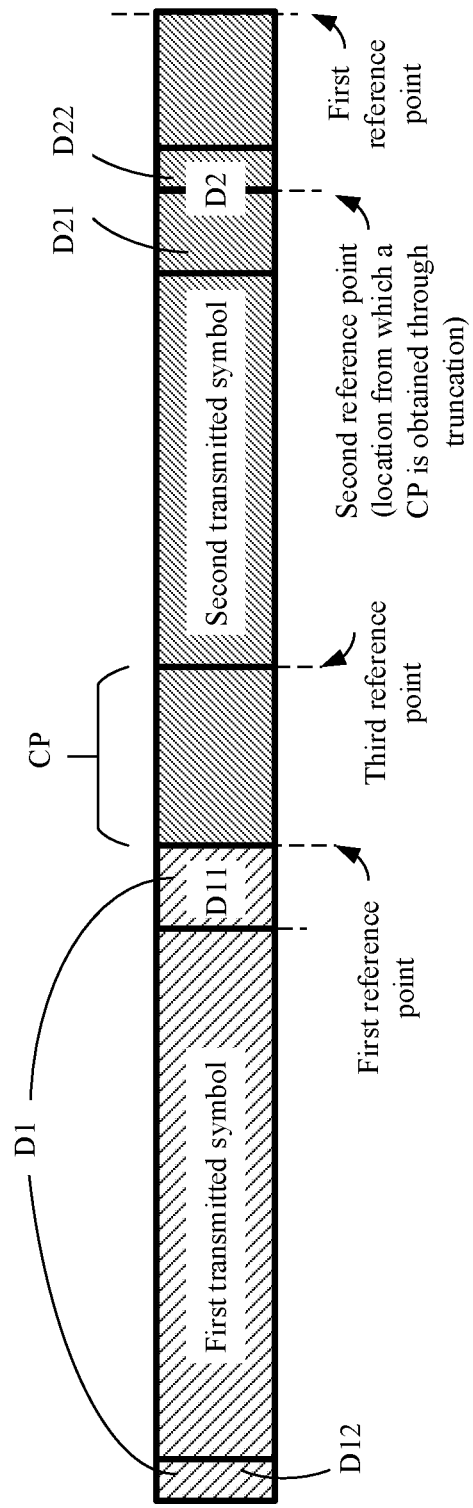
FIG. 12 is still another schematic diagram of a time domain structure of a transmitted symbol according to an embodiment of this application.

For example, time domain structures of the first transmitted symbol corresponding to the first set and the second transmitted symbol corresponding to the second set are shown in FIG. 12. The symbol component D1 in the first transmitted symbol is the same as the symbol component D2 in the second transmitted symbol, and an end location of the symbol component D1 is located at a location following the first reference point of the first transmitted symbol, in other words, the end location of the symbol component D1 is located at a header of the first transmitted symbol, and an end location of the symbol component D2 is located at a location following the second reference point of the second transmitted symbol. The first subset E11 in the first set obtained through the cyclic shift in step S840 corresponds to the symbol component D1 in the first transmitted symbol, and the second subset E21 in the second set obtained through the cyclic shift in step S840 corresponds to the symbol component D2 in the second transmitted symbol. As shown in FIG. 12, a symbol component D11 whose end location is the first reference point in the first transmitted symbol is the same as a symbol component D21 whose end location is the second reference point in the second transmitted symbol.

An execution window of step S840 varies with an application scenario.

In the application scenario 1, an execution occasion of step S840 may include 1, 2, or 3 shown in FIG. 6.

Optionally, as indicated by 1 in FIG. 6, step S840 is performed before DFT.

For example, after the copy operation in step S831 is performed on the first set and the second set, the cyclic shift described in step S840 is further performed on the first set and the second set before the DFT.

Optionally, as indicated by 2 in FIG. 6, step S840 is performed after DFT and before IFFT.

For example, after the copy operation in step S831 is performed on the first set and the second set, DFT is performed on the first set and the second set to separately obtain frequency domain signals of the first set and the second set, and then frequency domain weighting is performed on the frequency domain signals of the first set and the second set, to equivalently implement the cyclic shift described in step S840.

Optionally, as indicated by 3 in FIG. 6, step S840 is performed after IFFT and before a CP is added.

For example, after IFFT is performed, time domain symbols of the first set and the second set are obtained, and then a cyclic shift is performed on the time domain symbols of the first set and the second set.

In the application scenario 2, as indicated by 4 in FIG. 7, an execution occasion of step S840 may be 4 shown in FIG. 7, that is, step S840 is performed after a copy operation and before a CP is added.

Therefore, in this embodiment, by performing a cyclic shift on the sets obtained through the copy operation, impact on extension of a guard interval between symbols that is caused by an effect of filtering can be reduced to some extent.

Optionally, in another embodiment, in the embodiment shown in FIG. 9, the method further includes: performing a second copy operation on the first set and the second set, so that both the first set and the second set have second complex-valued symbols, a start location of a third subset E12 including the second complex-valued symbols in the first set corresponds to a third reference point of the first transmitted symbol, and a start location of a fourth subset E22 including the second complex-valued symbols in the second set corresponds to the second reference point of the second transmitted symbol, where the third reference point represents a start location of a transmitted symbol.

It should be understood that the second complex-valued symbol may include a plurality of complex-valued symbols.

It should be understood that the operation in this embodiment can achieve a same effect as that in the embodiment shown in FIG. 11. Therefore, the first transmitted symbol and the second transmitted symbol whose time domain structures are shown in FIG. 12 can also be generated based on the first set and the second set in this embodiment.

It should be noted that the second copy operation performed on the first set and the second set in this embodiment may also be understood as mapping the second complex-valued symbols in the first set and the second set.

Therefore, in this embodiment, impact on extension of a guard interval between symbols that is caused by an effect of filtering can also be reduced to some extent.

It should be understood that the second copy operation performed on the first set and the second set and the first copy operation performed on the first set and the second set in step S831 may be separately performed, or may be combined into one copy operation for execution.

Figure 13:
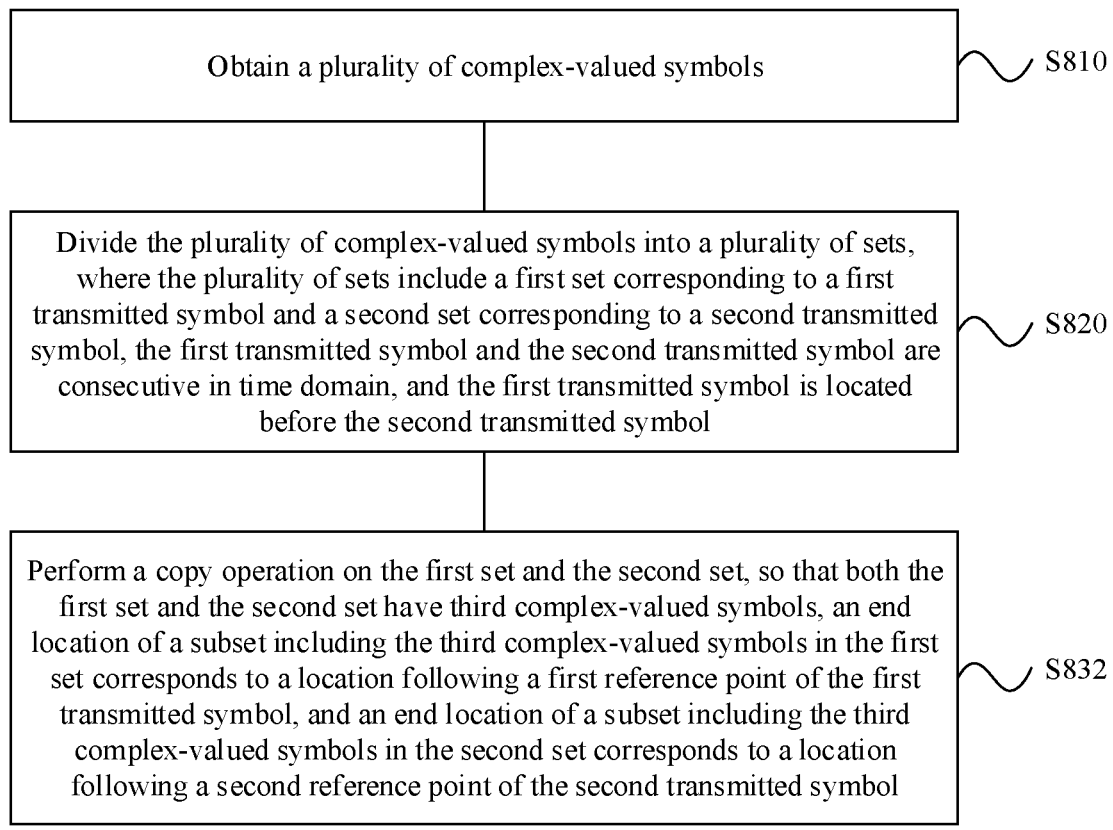
FIG. 13 is yet another schematic flowchart of a symbol processing method according to an embodiment of this application.

As shown in FIG. 13, optionally, in another embodiment, in the embodiment shown in FIG. 8, step S830 includes step S832.

Step S832: Perform a copy operation on the first set and the second set, so that both the first set and the second set have third complex-valued symbols, an end location of a subset E1 including the third complex-valued symbols in the first set corresponds to a location following the first reference point of the first transmitted symbol, and an end location of a subset E2 including the third complex-valued symbols in the second set corresponds to a location following the second reference point of the second transmitted symbol.

It should be understood that the third complex-valued symbol may include a plurality of complex-valued symbols.

It should be noted that the copy operation performed on the first set and the second set in this embodiment may also be understood as mapping the third complex-valued symbols in the first set and the second set.

It should be understood that the first transmitted symbol and the second transmitted symbol whose time domain structures are shown in FIG. 12 may be generated based on the first set and the second set in this embodiment. The subset E1 in the first set corresponds to the symbol component D1 in the first transmitted symbol, and the subset E2 in the second set corresponds to the symbol component D2 in the second transmitted symbol.

It should be understood that step S832 may also include two manners of forward copying and backward copying. Specific descriptions are similar to those of forward copying and backward copying described above. For brevity, details are not described herein again.

For example, when backward copying is used in step S832, in the example of FIG. 12, the symbol component D1 in the first transmitted symbol is copied into the second transmitted symbol, and the symbol component D2 in the second transmitted symbol comes from the symbol component D1 in the first transmitted symbol, where a symbol component D21 comes from a symbol component D11 in the first transmitted symbol, and a symbol component D22 comes from a symbol component D12 in the first transmitted symbol.

For example, when forward copying is used in step S832, in the example of FIG. 12, the symbol component D2 in the second transmitted symbol is copied into the first transmitted symbol, and the symbol component D1 in the first transmitted symbol comes from the symbol component D2 in the second transmitted symbol, where a symbol component D11 comes from a symbol component D21 in the second transmitted symbol, and a symbol component D12 comes from a symbol component D22 in the second transmitted symbol.

It should be understood that, in this embodiment, impact on extension of a guard interval between symbols that is caused by an effect of filtering can also be reduced to some extent.

This embodiment of this application may be applied to generating a DFT-s-OFDM symbol and an SC-QAM symbol. In addition, this application may be further applied to generating a reference signal such as a DMRS.

For a DFT-s-OFDM waveform, a reference signal is usually generated in frequency domain, and subcarrier mapping is directly performed.

In a possible implementation, when the transmitted symbol is a reference signal, the copy operation in this embodiment of this application is performed after a sampling value of a time domain sequence converted from a reference signal frequency domain sequence is calculated.

Considering that the reference signal is used to estimate a channel, to ensure channel performance, a time domain sampling point including another symbol is not desirable in the reference signal.

Optionally, in this embodiment of this application, if a transmitted symbol x is a reference signal, and transmitted symbols preceding and following the transmitted symbol x are non-reference signals, forward copying is performed in step S830 for transmitted symbols preceding the transmitted symbol x (including the reference signal x), and backward copying is performed in step S830 for reference signals following the transmitted symbol x (including the reference signal x).

Optionally, in the foregoing embodiments of backward copying, the first transmitted symbol may be a reference signal, and the second transmitted symbol is a non-reference signal.

For example, the first transmitted symbol is a DMRS.

Optionally, in the foregoing embodiments of forward copying, the first transmitted symbol is a non-reference signal, and the second transmitted symbol may be a reference signal.

For example, the second transmitted symbol is a DMRS.

In this embodiment, a guard interval between symbols can be flexibly configured, and integrity of a reference signal can also be ensured.

Figure 14:
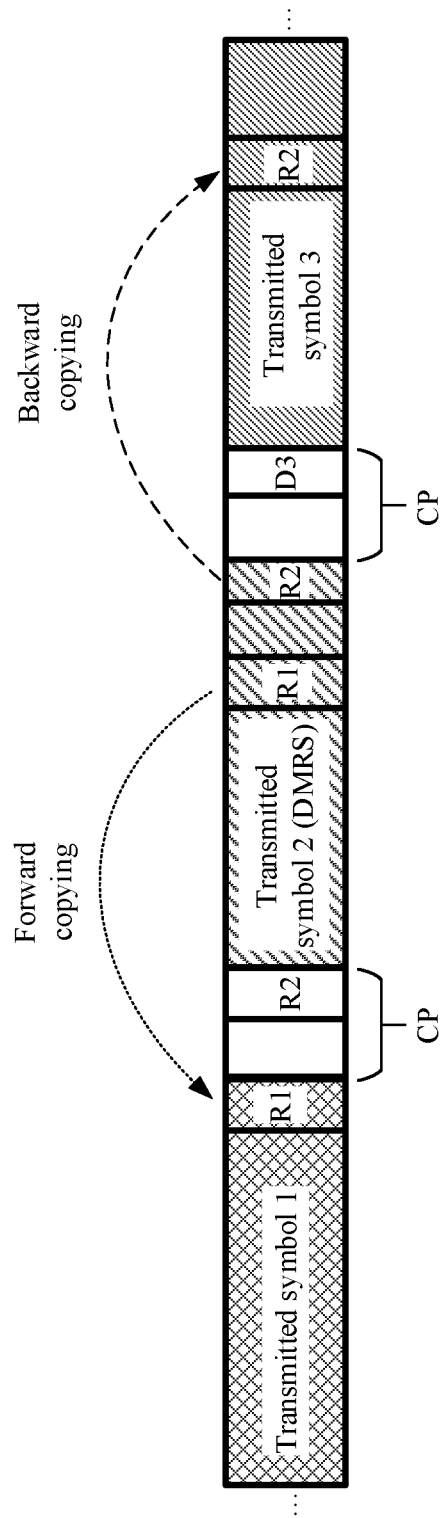
FIG. 14 is yet another schematic diagram of a time domain structure of a transmitted symbol according to an embodiment of this application.

FIG. 14 is a schematic diagram of time domain structures of three transmitted symbols (1, 2, and 3). The transmitted symbol 2 is a DMRS, the transmitted symbol 1 and the transmitted symbol 2 are non-reference signals, a copy relationship between a set 2 corresponding to the transmitted symbol 2 and a set 1 corresponding to the transmitted symbol 1 is forward copying, and a copy relationship between the set 2 corresponding to the transmitted symbol 2 and a set 3 corresponding to the transmitted symbol 3 is backward copying.

It can be learned from FIG. 14 that a symbol component R1 whose end location is a second reference point in the transmitted symbol 2 is copied into the transmitted symbol 1, an end location of the symbol component R1 copied into the transmitted symbol 1 is a first reference point of the transmitted symbol 1, a symbol component R2 whose end location is a first reference point in the transmitted symbol 2 is copied into the transmitted symbol 3, and an end location of the symbol component R2 copied into the transmitted symbol 3 is a first reference point of the transmitted symbol 3.

As shown in FIG. 14, the copy relationship between the transmitted symbol 2 and the symbol 1 is forward copying. To be specific, the symbol component R1 in the DMRS is forward copied into the symbol 1, and by analogy, a symbol component D0 in the symbol 1 is forward copied into a symbol (not shown in FIG. 14) preceding the symbol 1. The copy relationship between the DMRS and the symbol 3 is backward copying. To be specific, the symbol component R2 in the DMRS is backward copied into the symbol 3, and by analogy, a symbol component D3 in the symbol 3 is copied into a symbol (not shown in FIG. 14) following the symbol 3.

It should be understood that, in this embodiment, a guard interval between symbols can be flexibly configured, and accuracy of a reference signal can also be ensured, so that channel performance can be ensured.

When two or more transmitted symbols that are consecutive in time domain are reference signals, this application provides a symbol processing method. The method includes the following steps.

Step (1): Obtain a plurality of complex-valued symbols.

Step (2): Divide the plurality of complex-valued symbols into a plurality of sets, where the plurality of sets include a first set and a second set that are the same, the first set corresponds to a first transmitted symbol, the second set corresponds to a second transmitted symbol, the first transmitted symbol and the second transmitted symbol are consecutive in time domain, and the first transmitted symbol is located before the second transmitted symbol.

It should be understood that a time domain vector corresponding to the first set is the same as a time domain vector corresponding to the second set.

Step (3): Perform a cyclic shift on the first set and/or the second set, so that complex-valued symbols in a first subset in the first set are the same as complex-valued symbols in a second subset in the second set, where an end location of the first subset corresponds to a first reference point of the first transmitted symbol, and an end location of the second subset corresponds to a second reference point of the second transmitted symbol.

The first reference point represents an end location of a transmitted symbol, and the second reference point represents a location from which a CP is obtained through truncation in a transmitted symbol.

Optionally, the transmitted symbols corresponding to the first set and the second set are reference signals such as DMRSs.

It should be understood that, in this embodiment, no copy operation is performed on the first set and the second set, and when the transmitted symbols corresponding to the first set and the second set are reference signals, a guard interval between the reference signals can be flexibly configured while accuracy of the reference signals is ensured.

Optionally, in the foregoing embodiment related to FIG. 8, the method further includes: processing the plurality of sets obtained through the copy operation, to obtain a plurality of transmitted symbols, where the plurality of transmitted symbols include the first transmitted symbol and the second transmitted symbol, the first transmitted symbol and the second transmitted symbol are consecutive in time domain, and the first transmitted symbol is located before the second transmitted symbol. A symbol component whose end location is the first reference point in the first transmitted symbol is the same as a symbol component whose end location is the second reference point in the second transmitted symbol, the first reference point represents an end location of a transmitted symbol, and the second reference point represents a location from which a CP is obtained through truncation in a transmitted symbol.

In this application, for the first transmitted symbol and the second transmitted symbol that are consecutive in time domain, the symbol component whose end location is the first reference point in the first transmitted symbol and the symbol component whose end location is the second reference point in the second transmitted symbol are enabled to be the same, so that a guard interval between symbols can be flexibly configured by controlling a length of the symbol component.

Therefore, in this application, when a CP length is fixed, a guard interval between symbols can be flexibly configured, and a length of the guard interval can also be flexibly configured based on a user requirement.

It should be understood that, in addition to the embodiments provided in this specification, any other solution that can generate transmitted symbols whose time domain structures are shown in FIG. 3 falls within the protection scope of this application.

The embodiments described in this specification may be independent solutions, or may be combined based on internal logic. These solutions all fall within the protection scope of this application.

It may be understood that, in the foregoing method embodiments, an execution body may be a terminal device or a component (for example, a chip or a circuit) that may be used in a terminal device, or may be a network device or a component (for example, a chip or a circuit) that may be used in a network device.

The foregoing describes the method embodiments provided in the embodiments of this application, and the following describes apparatus embodiments provided in the embodiments of this application. It should be understood that descriptions of the apparatus embodiments correspond to the descriptions of the method embodiments. Therefore, for content that is not described in detail, refer to the foregoing method embodiments. For brevity, details are not described herein again.

Figure 15:
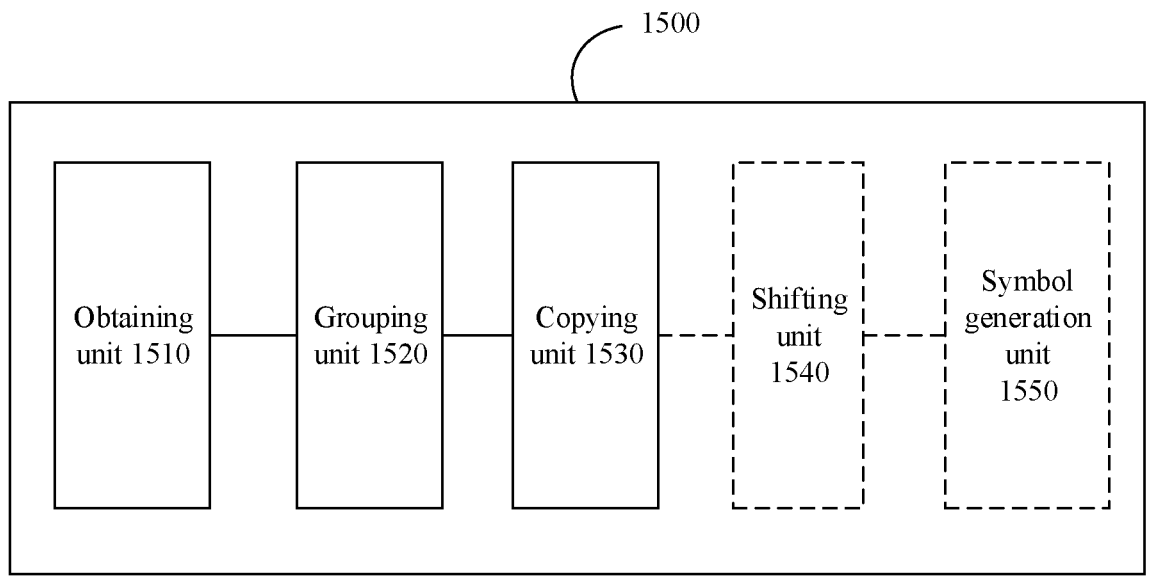
FIG. 15 is a schematic block diagram of a symbol processing apparatus according to an embodiment of this application.

FIG. 15 is a schematic block diagram of a symbol processing apparatus 1500 according to an embodiment of this application. The apparatus 1500 includes the following units:

an obtaining unit 1510, configured to obtain a plurality of complex-valued symbols;

a grouping unit 1520, configured to divide the plurality of complex-valued symbols into a plurality of sets, where each set corresponds to one transmitted symbol; and a copying unit 1530, configured to perform a copy operation on the plurality of sets, so that two sets corresponding to two transmitted symbols that are consecutive in time domain have some same complex-valued symbols.

In this application, a copy operation is performed on two sets corresponding to two transmitted symbols that are consecutive in time domain, so that the two sets have same complex-valued symbols. This helps generate a first transmitted symbol and a second transmitted symbol whose time domain structures are shown in FIG. 3. Therefore, in this application, a guard interval between symbols can be flexibly configured when a CP length is fixed.

Optionally, in some embodiments, the plurality of sets include a first set corresponding to the first transmitted symbol and a second set corresponding to the second transmitted symbol, the first transmitted symbol and the second transmitted symbol are consecutive in time domain, and the first transmitted symbol is located before the second transmitted symbol. The copying unit 1530 is configured to perform a first copy operation on the first set and the second set, so that both the first set and the second set have first complex-valued symbols, an end location of a first subset including the first complex-valued symbols in the first set corresponds to a first reference point of the first transmitted symbol, and an end location of a second subset including the first complex-valued symbols in the second set corresponds to a second reference point of the second transmitted symbol, where the first reference point represents an end location of a transmitted symbol, and the second reference point represents a location from which a CP is obtained through truncation in a transmitted symbol.

For example, a time domain vector corresponding to the first subset is a subvector $x_l[1]$ in a time domain vector corresponding to the first set:

$$x_l[1]=[x_l(M-M_l^1), x_l(M-M_l^1+1), \ldots, x_l(M-1)]^T; \text{ and}$$

a time domain vector corresponding to the second subset is a subvector $x_{l+1}[2]$ in a time domain vector corresponding to the second set:

$$x_{l+1}[2]=[x_{l+1}(M-M_l^1-K), x_{l+1}(M-M_l^1-K+1), \ldots, x_{l+1}(M-K-1)]^T,$$

where
M represents dimensions of the time domain vectors separately corresponding to the first set and the second set, $M_l^1$ represents a length of a subset including the first complex-valued symbols, M−K−1 represents a time domain index of the second reference point of the second transmitted symbol in the time domain vector corresponding to the second set, and a value of K is related to a CP length.

Optionally, in some embodiments, the copying unit 1530 is configured to copy the first complex-valued symbols in the first set into the second set.

For example, a time domain vector corresponding to a first subset including the first complex-valued symbols copied in the first set is $x_l[1]$ described above, and a time domain vector corresponding to a second subset including the first complex-valued symbols copied into the second set from the first set is $x_{l+1}[2]$ described above.

Optionally, in this embodiment, the first transmitted symbol is a reference signal, and the second transmitted symbol is a non-reference signal.

Optionally, in some embodiments, the copying unit 1530 is configured to copy the first complex-valued symbols in the second set into the first set.

For example, a time domain vector corresponding to a second subset including the first complex-valued symbols copied in the second set is $x_{l+1}[2]$ described above, and a time domain vector corresponding to a first subset including the first complex-valued symbols copied into the first set from the second set is $x_l[1]$ described above.

Optionally, in this embodiment, the first transmitted symbol is a non-reference signal, and the second transmitted symbol is a reference signal.

Optionally, in some embodiments, the apparatus 1500 further includes a shifting unit 1540, configured to separately perform a cyclic shift on the first set and the second set based on a same step and direction, so that the end location of the first subset corresponds to a location following the first reference point of the first transmitted symbol, and the end location of the second subset corresponds to a location following the second reference point of the second transmitted symbol.

Optionally, in some embodiments, the copying unit 1530 is further configured to perform a second copy operation on the first set and the second set, so that both the first set and the second set have second complex-valued symbols, a start location of a third subset including the second complex-valued symbols in the first set corresponds to a third reference point of the first transmitted symbol, and a start location of a fourth subset including the second complex-valued symbols in the second set corresponds to the second reference point of the second transmitted symbol, where the third reference point represents a start location of a transmitted symbol.

Optionally, in some embodiments, the apparatus 1500 further includes a symbol generation unit 1550, configured to process the plurality of sets obtained through the copy operation, to obtain a plurality of transmitted symbols, where the plurality of transmitted symbols include the first transmitted symbol and the second transmitted symbol, the first transmitted symbol and the second transmitted symbol are consecutive in time domain, and the first transmitted symbol is located before the second transmitted symbol. A symbol component whose end location is the first reference point in the first transmitted symbol is the same as a symbol component whose end location is the second reference point in the second transmitted symbol, the first reference point represents an end location of a transmitted symbol, and the second reference point represents a location from which a CP is obtained through truncation in a transmitted symbol.

Therefore, in this application, when a CP length is fixed, a guard interval between symbols can be flexibly configured, and a length of the guard interval can also be flexibly configured based on a user requirement.

Optionally, the obtaining unit 1510 may include a modulation subunit, configured to modulate an encoded bit stream to obtain a modulated symbol, where the modulated symbol may also be referred to as a complex-valued symbol.

Optionally, the obtaining unit 1510 is configured to obtain, based on a PTRS sampling point and the modulated symbol, a plurality of complex-valued symbols for processing by the grouping unit 1520.

Figure 16:
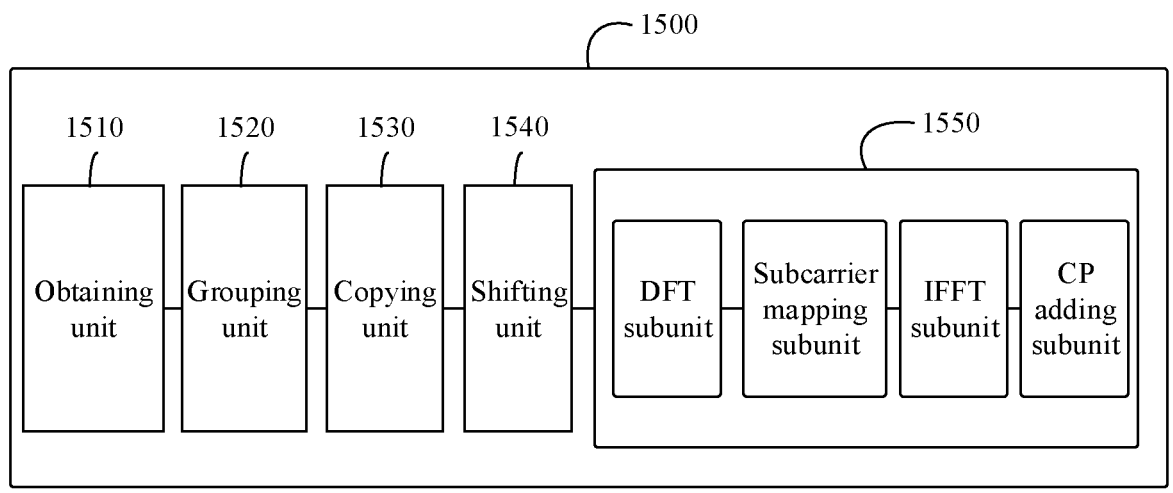
FIG. 16 is another schematic block diagram of a symbol processing apparatus according to an embodiment of this application.

Optionally, when the apparatus 1500 is applied to the application scenario 1, for example, as shown in FIG. 16, the symbol generation unit 1550 may include a DFT subunit, a subcarrier mapping subunit, an IFFT subunit, and a CP adding subunit.

In FIG. 16, the shifting unit 1540 is located between the copying unit 1530 and the symbol generation unit 1550, but this is only one implementation.

Optionally, the shifting unit 1540 may be located in the symbol generation unit 1550. For example, the shifting unit 1540 is located between the DFT subunit and the IFFT subunit. For another example, the shifting unit 1540 is located between the IFFT subunit and the CP adding subunit.

Figure 17:
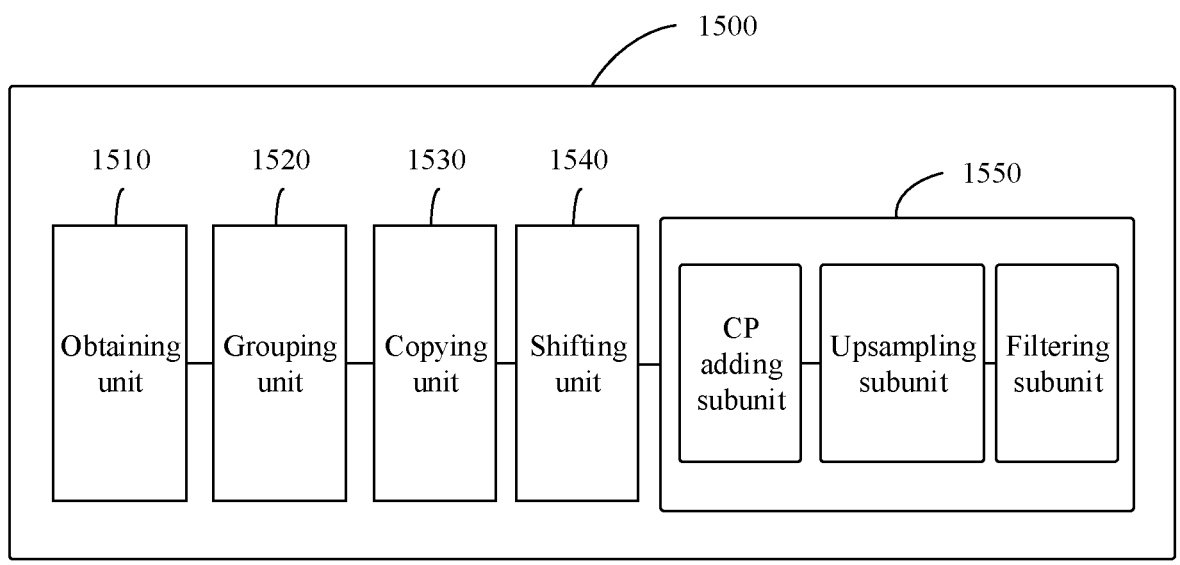
FIG. 17 is still another schematic block diagram of a symbol processing apparatus according to an embodiment of this application.

Optionally, when the apparatus 1500 is applied to the application scenario 2, for example, as shown in FIG. 17, the symbol generation unit 1550 may include a CP adding subunit, an upsampling subunit, and a filtering subunit.

Optionally, in another embodiment of the apparatus 1500, the obtaining unit 1510 is configured to obtain a plurality of complex-valued symbols. The grouping unit 1520 is configured to divide the plurality of complex-valued symbols into a plurality of sets, where the plurality of sets include a first set and a second set that are the same, the first set corresponds to a first transmitted symbol, the second set corresponds to a second transmitted symbol, the first transmitted symbol and the second transmitted symbol are consecutive in time domain, and the first transmitted symbol is located before the second transmitted symbol. The shifting unit 1540 is configured to perform a cyclic shift on the first set and/or the second set, so that complex-valued symbols in a first subset in the first set are the same as complex-valued symbols in a second subset in the second set. An end location of the first subset corresponds to a first reference point of the first transmitted symbol, and an end location of the second subset corresponds to a second reference point of the second transmitted symbol. The first reference point represents an end location of a transmitted symbol, and the second reference point represents a location from which a CP is obtained through truncation in a transmitted symbol.

Optionally, in this embodiment, both the first transmitted symbol and the second transmitted symbol are reference signals. For example, both the first transmitted symbol and the second transmitted symbol are DMRSs.

Optionally, the obtaining unit 1510, the grouping unit 1520, and the copying unit 1530 (or the obtaining unit 1510, the grouping unit 1520, the copying unit 1530, the shifting unit 1540, and the symbol generation unit 1550) may be implemented by using software, may be implemented by using hardware, or may be implemented by using hardware and software. In addition, the obtaining unit 1510, the grouping unit 1520, and the copying unit 1530 (or the obtaining unit 1510, the grouping unit 1520, the copying unit 1530, the shifting unit 1540, and the symbol generation unit 1550) may be different chips, or may be integrated into one chip or integrated circuit.

Optionally, in the foregoing embodiment, the obtaining unit 1510, the grouping unit 1520, the copying unit 1530, the shifting unit 1540, and the symbol generation unit 1550 each may be implemented by using a processor or a related circuit of a processor.

Figure 18:
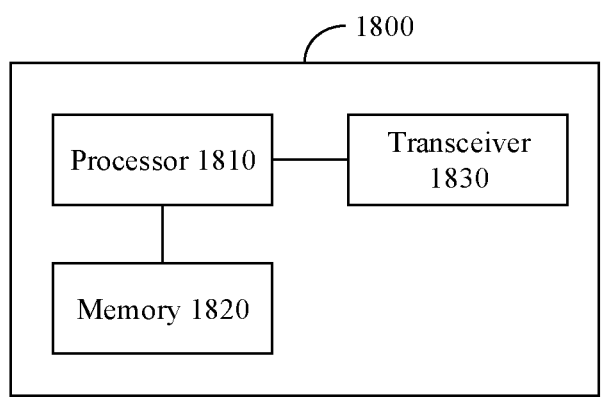
FIG. 18 is yet another schematic block diagram of a symbol processing apparatus according to an embodiment of this application.

As shown in FIG. 18, an embodiment of this application further provides a symbol processing apparatus 1800. The apparatus 1800 includes a processor 1810, a memory 1820, and a transceiver 1830. The memory 1820 stores a program. The processor 1810 is configured to execute the program stored in the memory 1820. Execution of the program stored in the memory 1820 enables the processor 1810 to perform related processing steps in the foregoing method embodiments, and enables the processor 1810 to control the transceiver 1830 to perform receiving/sending related steps in the foregoing method embodiments.

An embodiment of this application further provides a communication apparatus 1900. The communication apparatus 1900 may be a terminal device or a chip. The communication device 1900 may be configured to execute the foregoing method embodiments.

Figure 19:
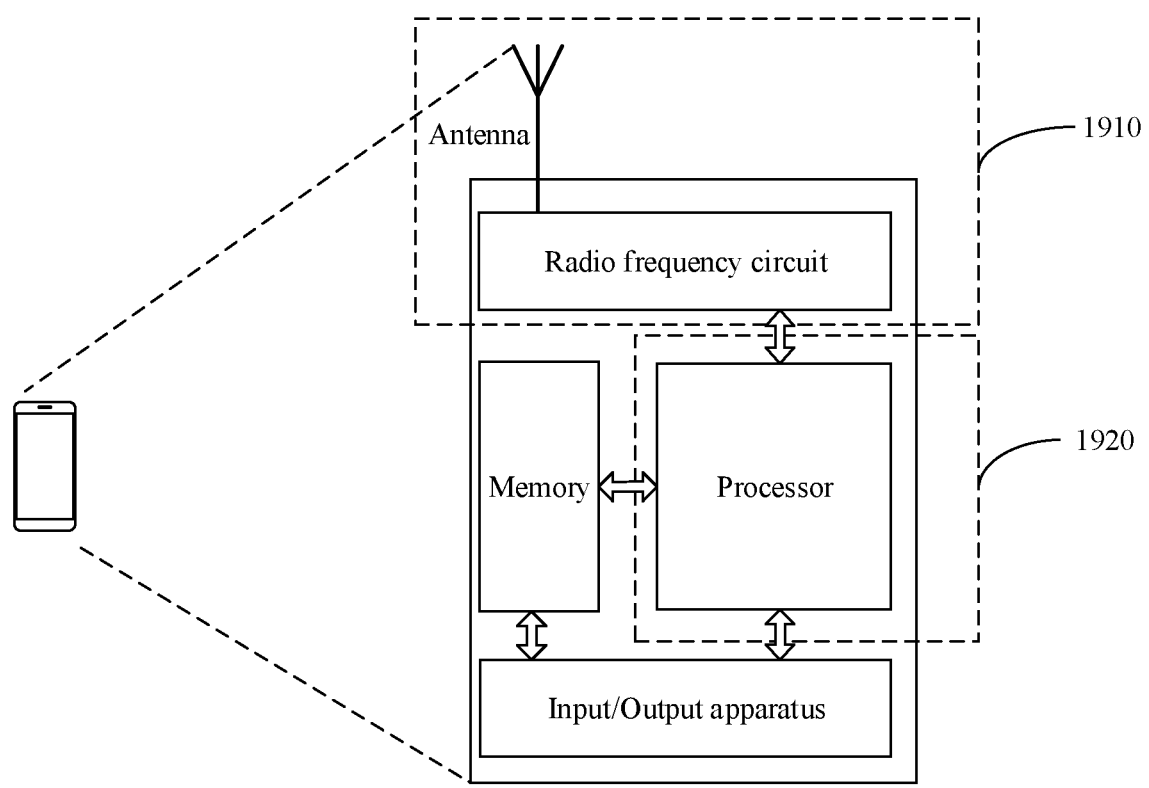
FIG. 19 is a schematic block diagram of a terminal device according to an embodiment of this application.

When the communication device 1900 is a terminal device, FIG. 19 is a simplified schematic diagram of a structure of the terminal device. For ease of understanding and illustration, an example in which the terminal device is a mobile phone is used in FIG. 19. As shown in FIG. 19, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data entered by a user and output data to the user. It should be noted that some types of terminal devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 19 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device.

As shown in FIG. 19, the terminal device includes a transceiver unit 1910 and a processing unit 1920. The transceiver unit 1910 may also be referred to as a transceiver, a transceiver machine, a transceiver apparatus, or the like. The processing unit 1920 may also be referred to as a processor, a processing board, a processing module, a processing apparatus, or the like. Optionally, a component that is in the transceiver unit 1910 and that is configured to implement a receiving function may be considered as a receiving unit, and a component that is in the transceiver unit 1910 and that is configured to implement a sending function may be considered as a sending unit. In other words, the transceiver unit 1910 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like.

For example, in an implementation, the processing unit 1920 is configured to execute the foregoing method embodiments. The transceiver unit 1910 is configured to perform related receiving/sending operations in the foregoing method embodiments. For example, the transceiver unit 1910 is configured to send a DFT-s-OFDM symbol or an SC-QAM symbol.

It should be understood that FIG. 19 is merely an example instead of a limitation. The terminal device including the transceiver unit and the processing unit may not depend on the structure shown in FIG. 19.

When the communication device 1900 is a chip, the chip includes a transceiver unit and a processing unit. The transceiver unit may be an input/output circuit or a communication interface. The processing unit may be a processor, a microprocessor, or an integrated circuit integrated on the chip.

An embodiment of this application further provides a communication device 2000. The communication device 2000 may be a network device or a chip. The communication device 2000 may be configured to execute the foregoing method embodiments.

Figure 20:
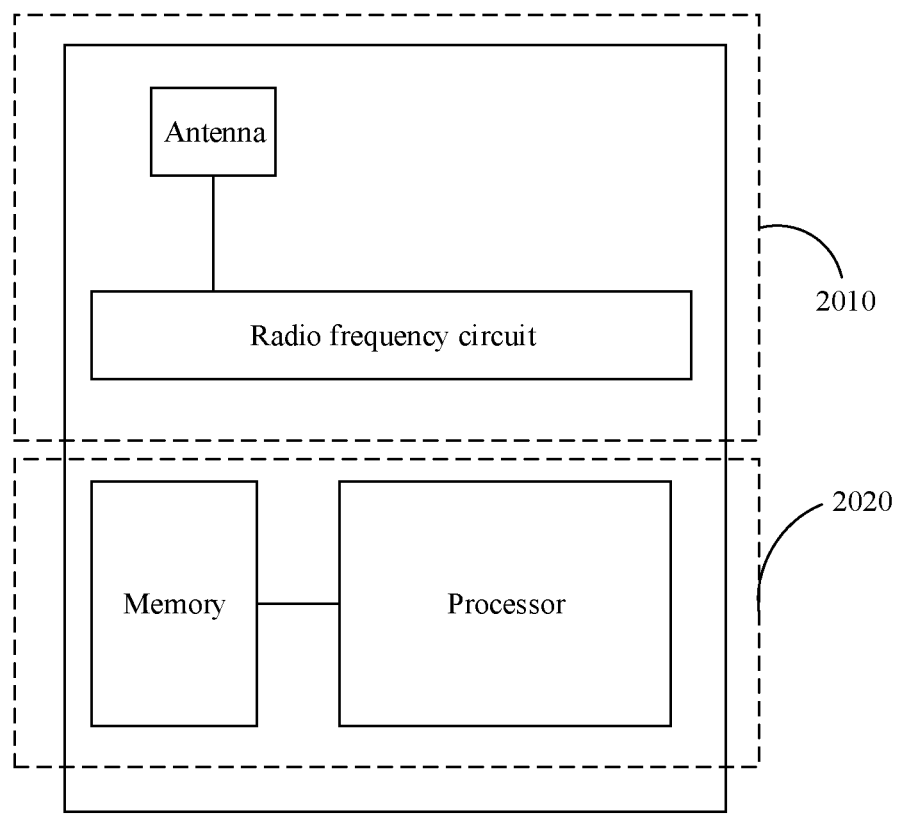
FIG. 20 is a schematic block diagram of a network device according to an embodiment of this application.

When the communication device 2000 is a network device, for example, a base station, FIG. 20 is a simplified schematic diagram of a structure of the base station. The base station includes a part 2010 and a part 2020. The part 2010 is mainly configured to: receive and send a radio frequency signal, and perform conversion between a radio frequency signal and a baseband signal. The part 2020 is mainly configured to: perform baseband processing, control the base station, and the like. The part 2010 may be usually referred to as a transceiver unit, a transceiver machine, a transceiver circuit, a transceiver, or the like. The part 2020 is usually a control center of the base station, and may be usually referred to as a processing unit, and is configured to control the base station to perform a processing operation on the network device side in the foregoing method embodiments.

The transceiver unit in the part 2010 may also be referred to as a transceiver machine, a transceiver, or the like. The transceiver unit includes an antenna and a radio frequency unit. The radio frequency unit is mainly configured to perform radio frequency processing. Optionally, a component that is in the part 2010 and that is configured to implement a receiving function may be considered as a receiving unit, and a component that is configured to implement a sending function may be considered as a sending unit. In other words, the part 2010 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The part 2020 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, the plurality of boards may share one or more processors, or the plurality of boards may share one or more memories, or the plurality of boards may simultaneously share one or more processors.

For example, in an implementation, the part 2020 is configured to execute the foregoing method embodiments. The part 2010 is configured to perform related receiving/sending operations in the foregoing method embodiments. For example, the part 2010 is configured to send a DFT-s-OFDM symbol or an SC-QAM symbol.

It should be understood that FIG. 10 is merely an example instead of a limitation. The network device including the transceiver unit and the processing unit may not depend on the structure shown in FIG. 10.

When the communication device 2000 is a chip, the chip includes a transceiver unit and a processing unit. The transceiver unit may be an input/output circuit or a communication interface. The processing unit may be a processor, a microprocessor, or an integrated circuit integrated on the chip.

The terminal device in the embodiments of this application includes a handheld device, a vehicle-mounted device, a wearable device, or a computing device that has a wireless communication function. Specifically, the terminal device may be user equipment (UE), an access terminal, a subscriber unit, a subscriber station, a mobile station, a remote station, a remote terminal, a mobile device, a user terminal, a terminal, a wireless communication device, a user agent, or a user apparatus. For example, the terminal device may be a mobile phone (mobile phone), a tablet computer, or a computer that has a wireless transceiver function. The terminal device may alternatively be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city (smart city), a wireless terminal in a smart home (smart home), or the like. The terminal device may be a terminal device in a 5G network, a terminal device in a future evolved public land mobile network (PLMN), or the like.

The network device in the embodiments of this application may be configured to communicate with one or more terminal devices, or may be configured to communicate with one or more base stations that have some terminal functions (for example, communication between a macro base station and a micro base station, such as an access point). The network device may be referred to as a base station. The base station may be in a plurality of forms, for example, a macro base station, a micro base station, a relay station, and an access point. For example, the network device in the embodiments of this application may be a base station in NR, a base transceiver station (BTS) in a global system for mobile communications (GSM) or code division multiple access (CDMA), a NodeB (NB) in a wideband code division multiple access (WCDMA) system, or an evolved NodeB (eNB or eNodeB) in an LTE system. The base station in 5G NR may also be referred to as a transmission reception point (TRP) or a next generation NodeB (gNB).

An embodiment of this application further provides a computer-readable storage medium. The computer-readable storage medium stores a computer program. When the computer program is executed by a computer, the computer is enabled to implement the method in the foregoing method embodiments.

An embodiment of this application further provides a computer program product including instructions. When the instructions are executed by a computer, the computer is enabled to implement the method in the foregoing method embodiments.

For explanations and beneficial effects of related content of any of the communication apparatuses provided above, refer to the corresponding method embodiments provided above. Details are not described herein again.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by the terminal device or the network device, or by a function module, in the terminal device or network device, that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel and various other media that can store, include, and/or carry instructions and/or data.

It should be understood that, the processor mentioned in the embodiments of this application may be a CPU, or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

It may be further understood that the memory mentioned in the embodiments of this application may be a volatile memory or a nonvolatile memory, or may include a volatile memory and a nonvolatile memory. The nonvolatile memory may be a read-only memory (ROM), a programmable read-only memory (PROM), an EPROM, an electrically erasable programmable read-only memory (EEPROM), or a flash memory. The volatile memory may be a random access memory (RAM), used as an external cache. Through example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the apparatus embodiments described above are merely examples. For example, division into the units is merely logical function division, and may be other division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A symbol processing method, comprising:
obtaining a plurality of complex-valued symbols;
dividing the plurality of complex-valued symbols into a plurality of sequences, wherein each sequence corresponds to one symbol;
performing a copy operation on the plurality of sequences to produce two pluralities of sequences, corresponding to two symbols, each of the two pluralities of sequences of the two symbols having at least one complex-valued symbol that is the same; and
transmitting the two sequences consecutively in a time domain.
2. The method according to claim 1, wherein the plurality of sequences comprise a first sequence corresponding to a first transmitted symbol and a second sequence corresponding to a second transmitted symbol, the first transmitted symbol and the second transmitted symbol are consecutive in time domain, and the first transmitted symbol is located before the second transmitted symbol; and the performing a copy operation on the plurality of sequences comprises:
performing a first copy operation on the first sequence and the second sequence, so that both the first sequence and the second sequence have at least one same first complex-valued symbol, an end location of a first subsequence consisting of the at least one same first complex-valued symbol in the first sequence corresponds to a first reference point of the first transmitted symbol, and an end location of a second subsequence consisting of the at least one same first complex-valued symbol in the second sequence corresponds to a second reference point of the second transmitted symbol, wherein
the first reference point represents an end location of a transmitted symbol, and the second reference point represents a location from which a cyclic prefix is obtained through truncation in a transmitted symbol.

3. The method according to claim 2, wherein a time domain vector corresponding to the first subsequence is a subvector $x_l[1]$ in a time domain vector corresponding to the first sequence, wherein:

$$x_l[1]=[x_l(M-M_l^1),x_l(M-M_l^1+1),\ldots,x_l(M-1)]^T; \text{ and}$$

a time domain vector corresponding to the second subsequence is a subvector $x_{l+1}[2]$ in a time domain vector corresponding to the second sequence:

$$x_{l+1}[2]=[x_{l+1}(M-M_l^1-K),x_{l+1}(M-M_l^1-K+1),\ldots,x_{l+1}(M-K-1)]^T,$$

where
M represents dimensions of the time domain vectors separately corresponding to the first sequence and the second sequence, $M_l^1$ represents a length of a subsequence consisting of the first complex-valued symbols, M−K−1 represents a time domain index of the second reference point of the second transmitted symbol in the time domain vector corresponding to the second sequence, and a value of K is related to a cyclic prefix length.

4. The method according to claim 2, wherein the performing a first copy operation on the first sequence and the second sequence comprises:
copying the first complex-valued symbols in the first sequence into the second sequence.

5. The method according to claim 2, wherein the performing a copy operation on the first sequence and the second sequence comprises:
copying the first complex-valued symbols in the second sequence into the first sequence.

6. The method according to claim 2, wherein the method further comprises:
separately performing a cyclic shift on the first sequence and the second sequence based on a same step and direction, so that the end location of the first subsequence corresponds to a location following the first reference point of the first transmitted symbol, and the end location of the second subsequence corresponds to a location following the second reference point of the second transmitted symbol.

7. The method according to claim 2, wherein the method further comprises:
performing a second copy operation on the first sequence and the second sequence, so that both the first sequence and the second sequence have at least one same second complex-valued symbol, a start location of a third subsequence consisting of the second complex-valued symbols in the first sequence corresponds to a third reference point of the first transmitted symbol, and a start location of a fourth subsequence consisting of the second complex-valued symbols in the second sequence corresponds to the second reference point of the second transmitted symbol, wherein
the third reference point represents a start location of a transmitted symbol.

8. The method according to claim 4, wherein the first transmitted symbol is a reference signal, and the second transmitted symbol is a non-reference signal.

9. The method according to claim 5, wherein the first transmitted symbol is a non-reference signal, and the second transmitted symbol is a reference signal.

10. The method according to claim 1, wherein the method further comprises:
processing the plurality of sequences obtained through the copy operation, to obtain a first transmitted symbol and a second transmitted symbol, wherein the first transmitted symbol and the second transmitted symbol are consecutive in time domain, and the first transmitted symbol is located before the second transmitted symbol, wherein
a symbol component whose end location is a first reference point in the first transmitted symbol is the same as a symbol component whose end location is a second reference point in the second transmitted symbol, the first reference point represents an end location of a transmitted symbol, and the second reference point represents a location from which the cyclic prefix is obtained through truncation in a transmitted symbol.

11. The symbol processing method of claim 1 further including the step of generating a cyclic prefix for a user that is different from a cyclic prefix used for another user.

12. A symbol processing method, comprising:
obtaining a plurality of complex-valued symbols;
dividing the plurality of complex-valued symbols into a plurality of sequences, wherein the plurality of sequences comprise a first sequence and a second sequence that are the same, the first sequence corresponds to a first transmitted symbol, the second sequence corresponds to a second transmitted symbol, the first transmitted symbol and the second transmitted symbol are consecutive in time domain, and the first transmitted symbol is located before the second transmitted symbol;
performing a cyclic shift on the first sequence and/or the second sequence, so that complex-valued symbols in a first subsequence in the first sequence are the same as complex-valued symbols in a second subsequence in the second sequence, wherein an end location of the first subsequence corresponds to a first reference point of the first transmitted symbol, and an end location of the second subsequence corresponds to a second reference point of the second transmitted symbol; and
transmitting the first and second transmitted symbols in the time domain, wherein
the first reference point represents an end location of a transmitted symbol, and the second reference point represents a location from which a cyclic prefix is obtained through truncation in a transmitted symbol.

13. The method according to claim 12, wherein both the first transmitted symbol and the second transmitted symbol are demodulation reference signals.

14. A symbol processing apparatus, comprising a processor and a memory comprising instructions that, when executed by the processor, cause the apparatus to be configured to:

obtain a plurality of complex-valued symbols;

divide the plurality of complex-valued symbols into a plurality of sequences, wherein each sequence corresponds to one transmitted symbol;

perform a copy operation on the plurality of sequences, so that two sequences corresponding to two symbols have the at least one complex-valued symbol that is the same; and transmit the two sequences consecutively in a time domain.

15. The apparatus according to claim 14, wherein the plurality of sequences comprise a first sequence corresponding to a first transmitted symbol and a second sequence corresponding to a second transmitted symbol, the first transmitted symbol and the second transmitted symbol are consecutive in time domain, and the first transmitted symbol is located before the second transmitted symbol; and the instructions, when executed by the processor, cause the apparatus to be further configured to perform a first copy operation on the first sequence and the second sequence, so that both the first sequence and the second sequence have at least one same first complex-valued symbol, an end location of a first subsequence consisting of the at least one same first complex-valued symbol in the first sequence corresponds to a first reference point of the first transmitted symbol, and an end location of a second subsequence consisting of the at least one same first complex-valued symbol in the second sequence corresponds to a second reference point of the second transmitted symbol, wherein the first reference point represents an end location of a transmitted symbol, and the second reference point represents a location from which a cyclic prefix is obtained through truncation in a transmitted symbol.

16. The apparatus according to claim 15, wherein a time domain vector corresponding to the first subsequence is a subvector $X_l[1]$ in a time domain vector corresponding to the first sequence:

$$x_l[1]=[x_l(M-M_l^1), x_l(M-M_l^1+1), \ldots, x_l(M-1)]^T; \text{ and}$$

a time domain vector corresponding to the second subsequence is a subvector $x_{l+1}[2]$ in a time domain vector corresponding to the second sequence:

$$x_{l+1}[2]=[x_{l+1}(M-M_l^1-K), x_{l+1}(M-M_l^1-K+1), \ldots, x_{l+1}(M-K-1)]^T, \text{ where}$$

M represents dimensions of the time domain vectors separately corresponding to the first sequence and the second sequence, $M_l^1$ represents a length of a subsequence consisting of the first complex-valued symbols, $M-K-1$ represents a time domain index of the second reference point of the second transmitted symbol in the time domain vector corresponding to the second sequence, and a value of K is related to a cyclic prefix length.

17. The apparatus according to claim 15, wherein the instructions, when executed by the processor, cause the apparatus to be further configured to copy the first complex-valued symbols in the first sequence into the second sequence.

18. The apparatus according to claim 15, wherein the instructions, when executed by the processor, cause the apparatus to be further configured to copy the first complex-valued symbols in the second sequence into the first sequence.

19. The apparatus according to claim 15, wherein:

the instructions, when executed by the processor, cause the apparatus to be further configured to separately perform a cyclic shift on the first sequence and the second sequence based on a same step and direction, so that the end location of the first subsequence corresponds to a location following the first reference point of the first transmitted symbol, and the end location of the second subsequence corresponds to a location following the second reference point of the second transmitted symbol.

20. The apparatus according to claim 15, wherein the instructions, when executed by the processor, cause the apparatus to be further configured to perform a second copy operation on the first sequence and the second sequence, so that both the first sequence and the second sequence have second complex-valued symbols, a start location of a third subsequence consisting of the second complex-valued symbols in the first sequence corresponds to a third reference point of the first transmitted symbol, and a start location of a fourth subsequence consisting of the second complex-valued symbols in the second sequence corresponds to the second reference point of the second transmitted symbol, wherein the third reference point represents a start location of a transmitted symbol.

21. The apparatus according to claim 17, wherein the first transmitted symbol is a reference signal, and the second transmitted symbol is a non-reference signal.

22. The apparatus of claim 14 further including the apparatus being configured to generate a cyclic prefix for a user that is different from a cyclic prefix used for another user.

* * * * *